(12) United States Patent
Lazier et al.

(10) Patent No.: US 11,537,587 B2
(45) Date of Patent: *Dec. 27, 2022

(54) TECHNIQUES AND SYSTEMS FOR STORAGE AND PROCESSING OF OPERATIONAL DATA

(71) Applicant: Amazon Technologies, Inc., Seattle, WA (US)

(72) Inventors: Colin Laird Lazier, Seattle, WA (US); Marco Argenti, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 42 days.

This patent is subject to a terminal disclaimer.

(21) Appl. No.: 16/866,094

(22) Filed: May 4, 2020

(65) Prior Publication Data
US 2020/0334223 A1 Oct. 22, 2020

Related U.S. Application Data

(63) Continuation of application No. 14/968,506, filed on Dec. 14, 2015, now Pat. No. 10,642,813.

(51) Int. Cl.
*G06F 16/22* (2019.01)
*G06F 16/955* (2019.01)
(Continued)

(52) U.S. Cl.
CPC ........ *G06F 16/2291* (2019.01); *G06F 16/955* (2019.01); *G06F 11/3452* (2013.01); *G06F 11/3476* (2013.01); *G06F 16/278* (2019.01)

(58) Field of Classification Search
CPC .. G06F 16/2291; G06F 16/955; G06F 16/278; G06F 16/256; G06F 16/2477; G06F 11/3452; G06F 11/3476
See application file for complete search history.

(56) References Cited

U.S. PATENT DOCUMENTS

| 5,488,701 A | 1/1996 | Brady et al. |
| 5,729,671 A | 3/1998 | Peterson et al. |

(Continued)

FOREIGN PATENT DOCUMENTS

| JP | 2004531923 A | 10/2004 |
| JP | 5858506 B1 | 2/2016 |

(Continued)

OTHER PUBLICATIONS

V. Aggarwal, C. Tian, V. A. Vaishampayan and Y. R. Chen, "Distributed data storage systems with opportunistic repair," IEEE INFOCOM 2014—IEEE Conference on Computer Communications, 2014, pp. 1833-1841, doi: 10.1109/INFOCOM.2014.6848122. (Year: 2014).*

(Continued)

*Primary Examiner* — Dennis Truong
(74) *Attorney, Agent, or Firm* — Davis Wright Tremaine LLP

(57) ABSTRACT

A system stores data, such as sensor data or other operational data, on a plurality of storage volumes in a sequence so as to allow for interpolations or other approximations of the data using a subset of the storage volumes in response to a request for information regarding that data. For example, a plurality of devices connect to the system to provide operational data, which is then stored in a specified sequence on a specified set of volumes. In response to a request for operational information regarding some or all of the devices, the system reads at least one of the volumes, and approximates the values of the data over a specified period of time. In some embodiments, the data may be buffered prior to storage, and a jitter analyzer determines whether the incoming data is anomalous relative to a baseline, which may be determined using related data sets.

20 Claims, 10 Drawing Sheets

(51) Int. Cl.
*G06F 11/34* (2006.01)
*G06F 16/27* (2019.01)
*G06F 16/25* (2019.01)
*G06F 16/2458* (2019.01)

(56) References Cited

U.S. PATENT DOCUMENTS

| | | | |
|---|---|---|---|
| 6,184,816 B1 * | 2/2001 | Zheng | G01S 7/06 |
| | | | 342/26 R |
| 6,249,836 B1 | 6/2001 | Downs et al. | |
| 6,549,587 B1 * | 4/2003 | Li | H04B 3/23 |
| | | | 375/324 |
| 6,574,587 B2 * | 6/2003 | Waclawski | G06F 11/3409 |
| | | | 702/179 |
| 6,665,565 B1 | 12/2003 | Stomberg et al. | |
| 6,779,150 B1 | 8/2004 | Walton et al. | |
| 6,799,117 B1 * | 9/2004 | Proett | E21B 49/08 |
| | | | 702/12 |
| 6,853,913 B2 * | 2/2005 | Cherveny | G01C 21/26 |
| | | | 701/461 |
| 6,862,362 B2 | 3/2005 | Gangadhar | |
| 6,922,700 B1 | 7/2005 | Aggarwal et al. | |
| 7,117,294 B1 | 10/2006 | Mi et al. | |
| 7,142,150 B2 | 11/2006 | Thackray | |
| 7,380,129 B2 | 5/2008 | Keohane et al. | |
| 7,418,478 B1 | 8/2008 | Orling et al. | |
| 7,483,934 B1 | 1/2009 | Ide et al. | |
| 7,490,013 B2 | 2/2009 | Wells | |
| 7,693,813 B1 | 4/2010 | Cao et al. | |
| 7,783,600 B1 | 8/2010 | Spertus et al. | |
| 7,805,706 B1 | 9/2010 | Ly et al. | |
| 7,930,611 B2 | 4/2011 | Huang et al. | |
| 8,050,881 B1 | 11/2011 | Yeung et al. | |
| 8,261,033 B1 | 9/2012 | Slik et al. | |
| 8,359,288 B1 * | 1/2013 | Kahn | G01C 21/3461 |
| | | | 707/602 |
| 8,386,841 B1 | 2/2013 | Renade | |
| 8,391,226 B2 | 3/2013 | Rune | |
| 8,413,187 B1 | 4/2013 | Del Sesto et al. | |
| 8,479,078 B2 | 7/2013 | Resch et al. | |
| 8,504,518 B1 | 8/2013 | Ghemawat et al. | |
| 8,504,535 B1 | 8/2013 | He et al. | |
| 8,612,219 B2 | 12/2013 | Tsuchinaga et al. | |
| 8,621,069 B1 | 12/2013 | Tompkins | |
| 8,706,451 B1 * | 4/2014 | Gross | G06F 11/3055 |
| | | | 703/2 |
| 8,706,980 B2 | 4/2014 | Dhuse et al. | |
| 8,769,049 B2 | 7/2014 | Murphy et al. | |
| 8,788,855 B2 | 7/2014 | Cong et al. | |
| 8,806,296 B1 | 8/2014 | Lazier | |
| 8,850,288 B1 | 9/2014 | Lazier et al. | |
| 8,868,825 B1 | 10/2014 | Hayes et al. | |
| 8,869,001 B1 | 10/2014 | Lazier | |
| 8,935,221 B1 | 1/2015 | Lazier et al. | |
| 8,935,761 B2 | 1/2015 | Gladwin et al. | |
| 8,938,591 B2 | 1/2015 | Mark et al. | |
| 8,959,067 B1 | 2/2015 | Patiejunas et al. | |
| 8,984,363 B1 | 3/2015 | Juels et al. | |
| 8,984,384 B1 | 3/2015 | Juels et al. | |
| 9,002,805 B1 | 4/2015 | Barber et al. | |
| 9,003,144 B1 | 4/2015 | Hayes et al. | |
| 9,009,491 B2 | 4/2015 | Resch | |
| 9,021,297 B1 | 4/2015 | Hayes et al. | |
| 9,047,214 B1 | 6/2015 | Northcott | |
| 9,052,942 B1 | 6/2015 | Barber et al. | |
| 9,092,441 B1 | 7/2015 | Patiejunas et al. | |
| 9,110,797 B1 | 8/2015 | Lazier | |
| 9,165,002 B1 | 10/2015 | Lazier | |
| 9,208,018 B1 | 12/2015 | Northcott et al. | |
| 9,213,485 B1 | 12/2015 | Hayes et al. | |
| 9,213,709 B2 | 12/2015 | Patiejunas et al. | |
| 9,218,244 B1 | 12/2015 | Hayes et al. | |
| 9,223,789 B1 | 12/2015 | Seigle et al. | |
| 9,225,675 B2 | 12/2015 | Patiejunas et al. | |
| 9,244,761 B2 | 1/2016 | Yekhanin et al. | |
| 9,250,811 B1 | 2/2016 | Patiejunas | |
| 9,251,097 B1 | 2/2016 | Kumar et al. | |
| 9,256,467 B1 | 2/2016 | Singh et al. | |
| 9,256,761 B1 | 2/2016 | Sahu et al. | |
| 9,270,683 B2 | 2/2016 | Coughlin et al. | |
| 9,271,052 B2 | 2/2016 | Holden | |
| 9,281,845 B1 | 3/2016 | Lazier | |
| 9,298,760 B1 | 3/2016 | Li et al. | |
| 9,313,172 B1 | 4/2016 | Brandwine | |
| 9,354,683 B2 | 5/2016 | Patiejunas et al. | |
| 9,378,084 B2 | 6/2016 | Calder et al. | |
| 9,405,333 B1 | 8/2016 | Pine | |
| 9,448,614 B2 | 9/2016 | Slik | |
| 9,449,346 B1 | 9/2016 | Hockey et al. | |
| 9,459,959 B1 | 10/2016 | Franklin et al. | |
| 9,461,876 B2 | 10/2016 | Van Dusen et al. | |
| 9,489,832 B2 | 11/2016 | Nair et al. | |
| 9,495,249 B1 | 11/2016 | Franklin et al. | |
| 9,495,255 B2 | 11/2016 | Davis et al. | |
| 9,513,820 B1 | 12/2016 | Shalev | |
| 9,563,681 B1 | 2/2017 | Patiejunas et al. | |
| 9,619,545 B2 * | 4/2017 | Hardy | G06F 16/278 |
| 9,672,110 B1 | 6/2017 | Patel | |
| 9,743,888 B2 * | 8/2017 | Pipke | G16H 50/20 |
| 9,753,669 B2 | 9/2017 | Ben-Shaul et al. | |
| 9,785,495 B1 * | 10/2017 | Lazier | G06F 11/0709 |
| 9,792,179 B1 | 10/2017 | Lazier | |
| 9,825,625 B2 | 11/2017 | Thalheim | |
| 9,825,652 B1 | 11/2017 | Lazier | |
| 9,838,041 B1 | 12/2017 | Lazier | |
| 9,838,042 B1 | 12/2017 | Lazier | |
| 9,853,662 B1 | 12/2017 | Lazier et al. | |
| 9,866,242 B1 | 1/2018 | Lazier | |
| 9,904,589 B1 | 2/2018 | Donlan et al. | |
| 9,923,966 B1 | 3/2018 | Franklin et al. | |
| 9,934,389 B2 | 4/2018 | Paterra et al. | |
| 9,998,539 B1 | 6/2018 | Brock et al. | |
| 10,061,668 B1 | 8/2018 | Lazier et al. | |
| 10,083,030 B1 | 9/2018 | Fant, IV et al. | |
| 10,097,356 B2 | 10/2018 | Zinder | |
| 10,645,582 B2 | 5/2020 | Wohlert et al. | |
| 2003/0032417 A1 | 2/2003 | Minear et al. | |
| 2003/0149603 A1 * | 8/2003 | Ferguson | G06Q 30/06 |
| | | | 705/64 |
| 2003/0172325 A1 | 9/2003 | Wyatt et al. | |
| 2004/0040025 A1 | 2/2004 | Lehtinen | |
| 2004/0054997 A1 | 3/2004 | Katragadda et al. | |
| 2004/0128470 A1 | 7/2004 | Hetzler et al. | |
| 2004/0230764 A1 | 11/2004 | Merchant et al. | |
| 2004/0268037 A1 | 12/2004 | Buchanan et al. | |
| 2006/0004675 A1 | 1/2006 | Bennett et al. | |
| 2006/0064709 A1 | 3/2006 | Throckmorton et al. | |
| 2006/0074954 A1 | 4/2006 | Hartline et al. | |
| 2006/0080574 A1 | 4/2006 | Saito et al. | |
| 2006/0117217 A1 | 6/2006 | Chien et al. | |
| 2006/0136928 A1 | 6/2006 | Crawford et al. | |
| 2006/0168575 A1 | 7/2006 | Bhatt et al. | |
| 2006/0168581 A1 | 7/2006 | Goger et al. | |
| 2007/0118657 A1 | 5/2007 | Kreitzer et al. | |
| 2007/0124020 A1 | 5/2007 | Staples | |
| 2007/0156842 A1 | 7/2007 | Vermeulen et al. | |
| 2007/0180294 A1 | 8/2007 | Kameyama et al. | |
| 2007/0245331 A1 | 10/2007 | Daynes et al. | |
| 2007/0262989 A1 * | 11/2007 | Buyanovskiy | G06T 15/83 |
| | | | 345/426 |
| 2008/0033914 A1 | 2/2008 | Cherniack et al. | |
| 2008/0189705 A1 | 8/2008 | Weinert et al. | |
| 2009/0094250 A1 | 4/2009 | Dhuse et al. | |
| 2009/0300616 A1 * | 12/2009 | Sicurello | A61B 5/14532 |
| | | | 718/100 |
| 2009/0319078 A1 * | 12/2009 | Jackson | G06Q 10/08 |
| | | | 700/227 |
| 2010/0131792 A1 | 5/2010 | Herrod | |
| 2010/0138764 A1 | 6/2010 | Hatambeiki et al. | |
| 2010/0153941 A1 | 6/2010 | Borissov et al. | |
| 2010/0306267 A1 | 12/2010 | Zamkoff et al. | |
| 2010/0318999 A1 | 12/2010 | Zhao et al. | |
| 2010/0328528 A1 | 12/2010 | Eggert | |

(56) References Cited

U.S. PATENT DOCUMENTS

| | | |
|---|---|---|
| 2010/0332751 A1 | 12/2010 | Quigley et al. |
| 2011/0022633 A1 | 1/2011 | Bernosky et al. |
| 2011/0055661 A1 | 3/2011 | Grube et al. |
| 2011/0078277 A1 | 3/2011 | Baptist |
| 2011/0092164 A1* | 4/2011 | Spanhake ............ H04W 40/10 455/67.11 |
| 2011/0153603 A1* | 6/2011 | Adiba ................. G06F 16/2477 707/E17.005 |
| 2011/0202929 A1 | 8/2011 | Schleimer et al. |
| 2011/0225209 A1 | 9/2011 | Volvovski et al. |
| 2011/0225426 A1 | 9/2011 | Agarwal et al. |
| 2011/0264717 A1 | 10/2011 | Grube et al. |
| 2011/0289263 A1 | 11/2011 | McWilliams et al. |
| 2011/0295560 A1* | 12/2011 | Crockford ............ G16H 20/30 702/187 |
| 2011/0296195 A1 | 12/2011 | Nakagawa et al. |
| 2011/0296440 A1 | 12/2011 | Laurich et al. |
| 2012/0011398 A1 | 1/2012 | Eckhardt et al. |
| 2012/0017096 A1 | 1/2012 | Snider |
| 2012/0079189 A1 | 3/2012 | Colgrove et al. |
| 2012/0079190 A1 | 3/2012 | Colgrove et al. |
| 2012/0110150 A1 | 5/2012 | Kosuru et al. |
| 2012/0130659 A1* | 5/2012 | Chaves .................. H03M 7/30 702/62 |
| 2012/0185437 A1 | 7/2012 | Pavlov et al. |
| 2012/0226933 A1 | 9/2012 | Baptist et al. |
| 2012/0243687 A1 | 9/2012 | Li et al. |
| 2012/0254089 A1 | 10/2012 | Alba et al. |
| 2012/0254175 A1 | 10/2012 | Horowitz et al. |
| 2012/0254690 A1 | 10/2012 | Resch et al. |
| 2012/0262303 A1* | 10/2012 | Fahey ................. A61B 5/0205 340/870.02 |
| 2012/0290539 A1 | 11/2012 | Bryant et al. |
| 2012/0297311 A1 | 11/2012 | Duggal |
| 2012/0310878 A1 | 12/2012 | Vuksan et al. |
| 2012/0322422 A1 | 12/2012 | Frecks, Jr. et al. |
| 2012/0331088 A1 | 12/2012 | O'Hare et al. |
| 2013/0007511 A1 | 1/2013 | Gaertner et al. |
| 2013/0024172 A1 | 1/2013 | Suyama et al. |
| 2013/0029641 A1 | 1/2013 | Hickie |
| 2013/0073600 A1 | 3/2013 | Jenkins et al. |
| 2013/0109371 A1 | 5/2013 | Brogan et al. |
| 2013/0151653 A1 | 6/2013 | Sawicki et al. |
| 2013/0191527 A1 | 7/2013 | Ashok et al. |
| 2013/0226613 A1* | 8/2013 | Srinivasan ............ G16H 40/67 705/3 |
| 2013/0238932 A1 | 9/2013 | Resch |
| 2013/0275776 A1 | 10/2013 | Baptist et al. |
| 2013/0297964 A1 | 11/2013 | Hegdal et al. |
| 2013/0304711 A1 | 11/2013 | Resch |
| 2013/0326583 A1 | 12/2013 | Freihold et al. |
| 2014/0006357 A1* | 1/2014 | Davis .................. G06F 16/182 707/667 |
| 2014/0006458 A1 | 1/2014 | Hsieh et al. |
| 2014/0006850 A1 | 1/2014 | Aliev et al. |
| 2014/0007214 A1 | 1/2014 | Qureshi et al. |
| 2014/0019397 A1* | 1/2014 | Alexander ............ H04W 4/029 706/46 |
| 2014/0025338 A1* | 1/2014 | Blount ................. G01D 18/00 702/183 |
| 2014/0046906 A1 | 2/2014 | Patiejunas et al. |
| 2014/0046908 A1 | 2/2014 | Patiejunas et al. |
| 2014/0046909 A1 | 2/2014 | Patiejunas et al. |
| 2014/0047040 A1 | 2/2014 | Patiejunas et al. |
| 2014/0047261 A1 | 2/2014 | Patiejunas et al. |
| 2014/0108421 A1 | 4/2014 | Isaacson et al. |
| 2014/0122022 A1* | 5/2014 | Chen .................. G06F 16/2477 702/187 |
| 2014/0122572 A1 | 5/2014 | Finkelstein et al. |
| 2014/0149794 A1 | 5/2014 | Shetty et al. |
| 2014/0149986 A1 | 5/2014 | S M et al. |
| 2014/0153481 A1 | 6/2014 | Draznin et al. |
| 2014/0156632 A1 | 6/2014 | Yu et al. |
| 2014/0172866 A1* | 6/2014 | Lin ..................... G06F 16/2455 707/741 |
| 2014/0172867 A1* | 6/2014 | Lin ..................... G06F 16/2272 707/741 |
| 2014/0173058 A1 | 6/2014 | Twitchell, Jr. |
| 2014/0189388 A1 | 7/2014 | Lynar et al. |
| 2014/0200952 A1* | 7/2014 | Hampapur ............ G06Q 10/06 705/7.28 |
| 2014/0201541 A1 | 7/2014 | Paul et al. |
| 2014/0207680 A1 | 7/2014 | Rephlo |
| 2014/0298134 A1 | 10/2014 | Grube et al. |
| 2014/0304356 A1 | 10/2014 | Allen, Sr. et al. |
| 2014/0310571 A1 | 10/2014 | Fetterly et al. |
| 2014/0310792 A1 | 10/2014 | Hyland et al. |
| 2014/0344446 A1 | 11/2014 | Rjeili et al. |
| 2014/0351183 A1* | 11/2014 | Germain ................ E21B 44/00 706/12 |
| 2014/0351632 A1 | 11/2014 | Grube et al. |
| 2014/0351917 A1 | 11/2014 | Chickering |
| 2014/0372383 A1 | 12/2014 | Sipek |
| 2014/0380126 A1 | 12/2014 | Yekhanin et al. |
| 2015/0058473 A1 | 2/2015 | Grande |
| 2015/0149870 A1 | 5/2015 | Kozat |
| 2015/0154111 A1 | 6/2015 | D'Abreu et al. |
| 2015/0169716 A1 | 6/2015 | Franklin et al. |
| 2015/0175333 A1 | 6/2015 | Richardson et al. |
| 2015/0185716 A1* | 7/2015 | Wichmann ............ F01K 23/101 700/287 |
| 2015/0199300 A1* | 7/2015 | Picciotti ................ G07C 5/085 701/1 |
| 2015/0254125 A1 | 9/2015 | Kakui |
| 2015/0256423 A1 | 9/2015 | Stearns |
| 2015/0277856 A1* | 10/2015 | Payne ....................... G06F 7/58 708/255 |
| 2015/0278324 A1 | 10/2015 | Wong et al. |
| 2015/0324745 A1 | 11/2015 | Goodall et al. |
| 2015/0331635 A1 | 11/2015 | Ben-Shaul et al. |
| 2015/0350316 A1 | 12/2015 | Calder et al. |
| 2015/0350362 A1 | 12/2015 | Pollack et al. |
| 2015/0355974 A1 | 12/2015 | Hayes et al. |
| 2015/0356005 A1 | 12/2015 | Hayes et al. |
| 2016/0011816 A1 | 1/2016 | Aizman |
| 2016/0034295 A1 | 2/2016 | Cochran |
| 2016/0041868 A1 | 2/2016 | Davis et al. |
| 2016/0041869 A1 | 2/2016 | Davis et al. |
| 2016/0041878 A1 | 2/2016 | Davis et al. |
| 2016/0041887 A1 | 2/2016 | Davis et al. |
| 2016/0048399 A1 | 2/2016 | Shaw |
| 2016/0062623 A1 | 3/2016 | Howard et al. |
| 2016/0085797 A1 | 3/2016 | Patiejunas et al. |
| 2016/0092248 A1 | 3/2016 | Shani et al. |
| 2016/0179824 A1 | 6/2016 | Donlan et al. |
| 2016/0203477 A1 | 7/2016 | Yang et al. |
| 2016/0216991 A1 | 7/2016 | Ansari et al. |
| 2016/0283941 A1 | 9/2016 | Andrade |
| 2016/0327417 A1 | 11/2016 | Hara et al. |
| 2016/0335310 A1 | 11/2016 | Lahiri et al. |
| 2017/0024281 A1 | 1/2017 | Franklin et al. |
| 2017/0060687 A1 | 3/2017 | Franklin et al. |
| 2017/0097863 A1 | 4/2017 | Ishii et al. |
| 2017/0123728 A1 | 5/2017 | Rungta |
| 2017/0180346 A1 | 6/2017 | Suarez et al. |
| 2017/0222814 A1 | 8/2017 | Oberhauser et al. |
| 2017/0235848 A1 | 8/2017 | Van Dusen et al. |
| 2017/0250801 A1 | 8/2017 | Chen et al. |
| 2017/0262697 A1 | 9/2017 | Kaps et al. |
| 2017/0293669 A1 | 10/2017 | Madhavan et al. |
| 2017/0295023 A1 | 10/2017 | Madhavan et al. |
| 2017/0331896 A1 | 11/2017 | Holloway et al. |
| 2018/0082256 A1 | 3/2018 | Tummuru et al. |

FOREIGN PATENT DOCUMENTS

| | | |
|---|---|---|
| JP | 2016081134 A | 5/2016 |
| KR | 20130107383 A | 10/2013 |
| WO | 02071382 A1 | 9/2002 |

(56) References Cited

FOREIGN PATENT DOCUMENTS

| WO | 2014047073 A1 | 3/2014 |
|---|---|---|
| WO | 2016067295 A1 | 5/2016 |

OTHER PUBLICATIONS

Y. Wang, J. Wang and H. Li, "An Interpolation Approach for Missing Context Data Based on the Time-Space Relationship and Association Rule Mining," 2011 Third International Conference on Multimedia Information Networking and Security, 2011, pp. 623-627, doi: 10.1109/MINES.2011.78. (Year: 2011).*
"New! xTablet T7000 Rugged Mini Tablet PC," MobileDemand, copyright 2012 [web archive Mar. 12, 2012], https://web.archive.org/web/20120312010139/http://www.ruggedtabletpc.com/products/xtablet-t7000-rugged-mini-tablet-pc/, 3 pages.
Amazon, "Batch Cloud Data Transfer Services—Amazon Import/Export Snowball Appliance," Jun. 17, 2016, retrieved Oct. 8, 2016, https://web.archive.org/web/20160617044144/http://aws.amazon.com/importexport/, 6 pages.
Australian Examination Report No. 1 dated Feb. 3, 2020, Patent Application No. 2017336924, filed Sep. 29, 2017, 4 pages.
Australian Examination report No. 2 for Standard Patent Application dated Sep. 4, 2020, Patent Application No. 2017336924, 3 pages.
Australian Notice of Acceptance for Patent Application dated Oct. 28, 2020, Patent Application No. 2017336924, 3 pages.
Azaria et al., "MedRec: Using Blockchain for Medical Data Access and Permission Management," 2nd International Conference on Open and Big Data (OBD), Aug. 22, 2016.
Barr, "AWS Import/Export: Ship Us That Disk!," Amazon Web Services Blog, May 21, 2009, retrieved Mar. 14, 2017, https://aws.amazon.com/blogs/aws/send-us-that-data/, 7 pages.
Binns, "Elasticsearch Failure and Recovery," TechRabbit, Oct. 31, 2014 [retrieved Nov. 17, 2017], http://tech.taskrabbit.com/blog/2014/10/31/es-failure-recovery/, four pages.
Dang, "Recommendation for Applications Using Approved Hash Algorithms," National Institute of Standards and Technology (NIST) Special Publication 800-107 Revision 1, Aug. 2010, retrieved Nov. 24, 2015, http://csrc.nist.gov/publications/nistpubs/800-107-rev1/sp800-107-rev1.pdf, 25 pages.
European Communication Pursuant to Article 94(3) EPC dated Jul. 1, 2021, Patent Application No. 17783685.5, 12 pages.
European Office Action dated Nov. 6, 2018, Patent Application No. 16739357.8-1222, published May 9, 2018, 7 pages.
Franco, "Understanding Bitcoin: Cryptography, Engineering and Economics," Wiley, Nov. 24, 2014, 167 pages.
Greenspan et al., "MultiChain Private Blockchain—White Paper," http://web.archive.org/web/20150724003212if_/http://www.multichain.com/download/MultiChain-White-Paper.pdf, Jul. 24, 2015, pages.
He et al., "Elastic Application Container: A Lightweight Approach for Cloud Resource Provisioning," 26th IEEE International Conference on Advanced Information Networking and Applications, Mar. 26, 2012, pp. 15-22.
IEEE 100, "The Authoritative Dictionary of IEEE Standards Terms", Seventh Edition, IEEE Standards Information Network, IEEE Press, Dec. 2000, 5 pages (pertinent pp. 1, 2, 155, 207, 1112).
International Organization for Standardization/ International Electrotechnical Commission, "Information technology—Trusted Platform Module—Part 1: Overview," International Standard, ISO/IEC 11889-1(E), May 15, 2009, 20 pages.
International Organization for Standardization/International Electrotechnical Commission, "Information technology—Trusted Platform Module—Part 2: Design principles," International Standard, ISO/IEC 11889-2(E), May 15, 2009, 152 pages.
International Organization for Standardization/International Electrotechnical Commission, "Information technology—Trusted Platform Module—Part 3: Structures," International Standard, ISO/IEC 11889-3:2009(E), May 15, 2009, 204 pages.
International Organization for Standardization/International Electrotechnical Commission, "Information technology—Trusted Platform Module—Part 4: Commands," International Standard, ISO/IEC 11889-4:2009(E), May 15, 2009, 254 pages.
International Search Report and Written Opinion in International Patent Application No. PCT/US2015/050513, dated Feb. 16, 2016, 22 pages.
International Search Report and Written Opinion dated Aug. 25, 2016, International Patent Application No. PCT/US2016/040510, filed Jun. 30, 2016.
International Search Report and Written Opinion dated Feb. 4, 2016, International Patent Application No. PCT/US2015/059983, 12 pages.
International Search Report and Written Opinion dated Nov. 22, 2017, International Patent Application No. PCT/US2017/054319, filed Sep. 29, 2017, 14 pages.
Japanese Decision to Grant a Patent dated Jun. 2, 2020, Patent Application No. 2019-516608, 1 page.
Japanese Notice of Reasons for Rejection dated Feb. 18, 2020, Patent Application No. 2019-516608, filed Sep. 29, 2017, 3 pages.
Japanese Office Action dated Mar. 5, 2019, Patent Application No. 2017-566702, filed Mar. 22, 2017, 8 pages.
Kim, "How Sharding Works," Medium, Dec. 5, 2014 [retrieved Nov. 17, 2017], https://medium.com/@jeeyoungk/how-sharding-works-b4dec46b3f6, 12 pages.
MacCarthaigh, "Shuffle Sharding: Massive and Magical Fault Isolation," AWS Architecture Blog, Apr. 14, 2014 [retrieved Nov. 27, 2017], https://aws.amazon.com/blogs/architecture/shuffle-sharding-massive-and-magical-fault-isolation/, six pages.
PC Plus, "How to turn an old netbook into a NAS drive," TechRadar, Mar. 1, 2010 [retreived Feb. 5, 2019], https://www.techradar.com/news/networking/routers-storage/how-to-turn-an-old-netbook-into-a-nas-drive-670757, 12 pages.
Pikkarainen et al., "The impact of agile practices on communication in software development," Empirical Software Engineering 13(3):303-37, Jun. 1, 2008.
Ramamritham, "Allocation and scheduling of precedence-related periodic tasks," IEEE Transactions on Parallel and Distributed Systems 6(4):412-420, Apr. 1995.
Singaporean Second Written Opinion dated Jun. 14, 2021, Patent Application No. 11201902518S, 6 pages.
Singaporean Written Opinion dated May 14, 2020, Patent Application No. 11201902518S, 7 pages.
Soltesz et al., "Container-based Operating System Virtualization: A Scalable, High-Performance Alternative to Hypervisors," ACM SIGOPS Operating Systems Review 41(3):275-287, Mar. 2007.
Storer et al., "POTSHARDS—A Secure, Recoverable, Long-Term Archival Storage System," ACM Transactions on Storage, Published Jun. 2009, vol. 5, No. 2, Article 5, pp. 5:1 to 5:35.
Swan, "Blockchain: Blueprint for a New Economy," O'Reilly Media, Inc., Jan. 22, 2015, 144 pages.
Thiele et al., "Embedded Software in Network Processors—Models and Algorithms," Lecture Notes in Computer Science 2211:416-34, Oct. 8, 2001.
Third-Party Submission Under 37 CFR 1.290 dated Apr. 24, 2018, U.S. Appl. No. 15/283,017, filed Sep. 30, 2016, 10 pages.
Trusted Computing Group, "TPM Main, Part 1 Design Principles," Specification Version 1.2, Level 2 Revision 103, Jul. 9, 2007, 182 pages.
Trusted Computing Group, "TPM Main, Part 1 Design Principles," Specification Version 1.2, Revision 116, Mar. 1, 2011, 184 pages.
Trusted Computing Group, "TPM Main, Part 2 TPM Structures," Specification Version 1.2, Level 2 Revision 103, Jul. 9, 2007, 198 pages.
Trusted Computing Group, "TPM Main, Part 2 TPM Structures," Specification Version 1.2, Revision 116, Mar. 1, 2011, 201 pages.
Trusted Computing Group, "TPM Main, Part 3 Commands," Specification Version 1.2, Level 2 Revision 103, Jul. 9, 2007, 330 pages.
Trusted Computing Group, "TPM Main, Part 3 Commands," Specification Version 1.2, Revision 116, Mar. 1, 2011, 339 pages.
Van et al., "SLA-aware Virtual Resource Management for Cloud Infrastructures," IEEE Ninth International Conference on Computer and Information Technology, Oct. 11, 2009, pp. 357-362.

(56) References Cited

OTHER PUBLICATIONS

Wikipedia, "IEEE 802.11," Wikipedia, the Free Encyclopedia, page last modified Feb. 7, 2017, retrieved Feb. 13, 2017, https://en.wikipedia.org/wiki/IEEE_802.11, 9 pages.

Wikipedia, "IEEE 802.16," Wikipedia, the Free Encyclopedia, page last modified Nov. 21, 2016, retrieved Feb. 13, 2017, https://en.wikipedia.org/wiki/IEEE_802.16, 8 pages.

Wikipedia, "IEEE 802.21," Wikipedia, the Free Encyclopedia, page last modified Aug. 4, 2016, retrieved Feb. 13, 2017, https://en.wikipedia.org/wiki/IEEE_802.21, 3 pages.

Wood, "Ethereum: A Secure Decentralised Generalised Transaction Ledger: Final Draft—Under Review," Etereum Project Yellow Paper, http://tech.lab.carl.pro/kb/ethereum/yellowpaper, Apr. 2014, 32 pages.

Xavier et al., "Performance Evaluation of Container-based Virtualization for High Performance Computing Environments," Parallel, Distributed, and Network-Based Processing (PDP), 2013 21st Euromicro International Conference, Feb. 2013, pp. 233-240.

Zhao et al., "Experimental Study of Virtual Machine Migration in Support of Reservation of Cluster Resources," Proceedings of the 2nd International Workshop on Virtualization Technology in Distributed Computing, Nov. 2007, pp. 1-8.

Zheng et al., "Grid-partition index: a hybrid method for nearest-neighbor queries in wireless location-based services," The VLDB Journal—The International Journal on Very Large Data Bases 15(1):21-39, online publication Jul. 22, 2005, print publication Jan. 1, 2006.

Zyga, "Light-up Cereal Boxes Powered by Shelvers on Display at CES," Phys.org, Jan. 11, 2011, retrieved May 19, 2015, http://phys.org/news/201101lightupcerealpoweredshelvesces.html, 13 pages.

U.S. Appl. No. 14/968,701, filed Dec. 14, 2015.
U.S. Appl. No. 14/789,783, filed Jul. 1, 2015.
U.S. Appl. No. 14/741,409, filed Jun. 16, 2015.

* cited by examiner

TECHNIQUES AND SYSTEMS FOR STORAGE AND PROCESSING OF OPERATIONAL DATA

CROSS-REFERENCE TO RELATED APPLICATIONS

This application is a continuation of U.S. patent application Ser. No. 14/968,506, filed Dec. 14, 2015, entitled "TECHNIQUES AND SYSTEMS FOR STORAGE AND PROCESSING OF OPERATIONAL DATA," which incorporates by reference for all purposes the full disclosures of U.S. patent application Ser. No. 14/789,783, filed Jul. 1, 2015, now U.S. Pat. No. 10,162,704, entitled "GRID ENCODED DATA STORAGE SYSTEMS FOR EFFICIENT DATA REPAIR," U.S. patent application Ser. No. 14/741,409, filed Jun. 16, 2015, entitled "ADAPTIVE DATA LOSS MITIGATION FOR REDUNDANCY CODING SYSTEMS," and U.S. patent application Ser. No. 14/968,701, filed Dec. 14, 2015, now U.S. Pat. No. 9,785,495, entitled "TECHNIQUES AND SYSTEMS FOR DETECTING ANOMALOUS OPERATIONAL DATA."

BACKGROUND

Modern computer systems make extensive use of network computing and network data storage systems. Such use has proliferated in recent years, particularly in distributed or virtualized computer systems where multiple computer systems may share resources when performing operations and tasks associated with the computer systems. Such computer systems frequently utilize distributed data storage in multiple locations to store shared data items so that such data items may be made available to a plurality of consumers. The resources for network computing and network data storage are often provided by computing resource providers who leverage large-scale networks of computers, servers, and storage drives to enable customers to host and execute a variety of applications and web services. The usage of network computing and network data storage allows customers to efficiently and to adaptively satisfy their varying computing needs, whereby the computing and data storage resources that may be required by the customers are added or removed from a large pool provided by a computing resource provider as needed.

As the types of devices capable of utilizing such network computing and data storage resources broadens, storage of data generated by such devices becomes burdensome. Some types of data, such as operational data or other data (e.g., metadata) related to the operation of such devices, may be more useful in a derivative context, rather than a direct context, and thus the storage needs of such operational data may differ considerably from data whose primary significance is directly within the data itself.

BRIEF DESCRIPTION OF THE DRAWINGS

Various techniques will be described with reference to the drawings, in which.

DETAILED DESCRIPTION

Figure 1:
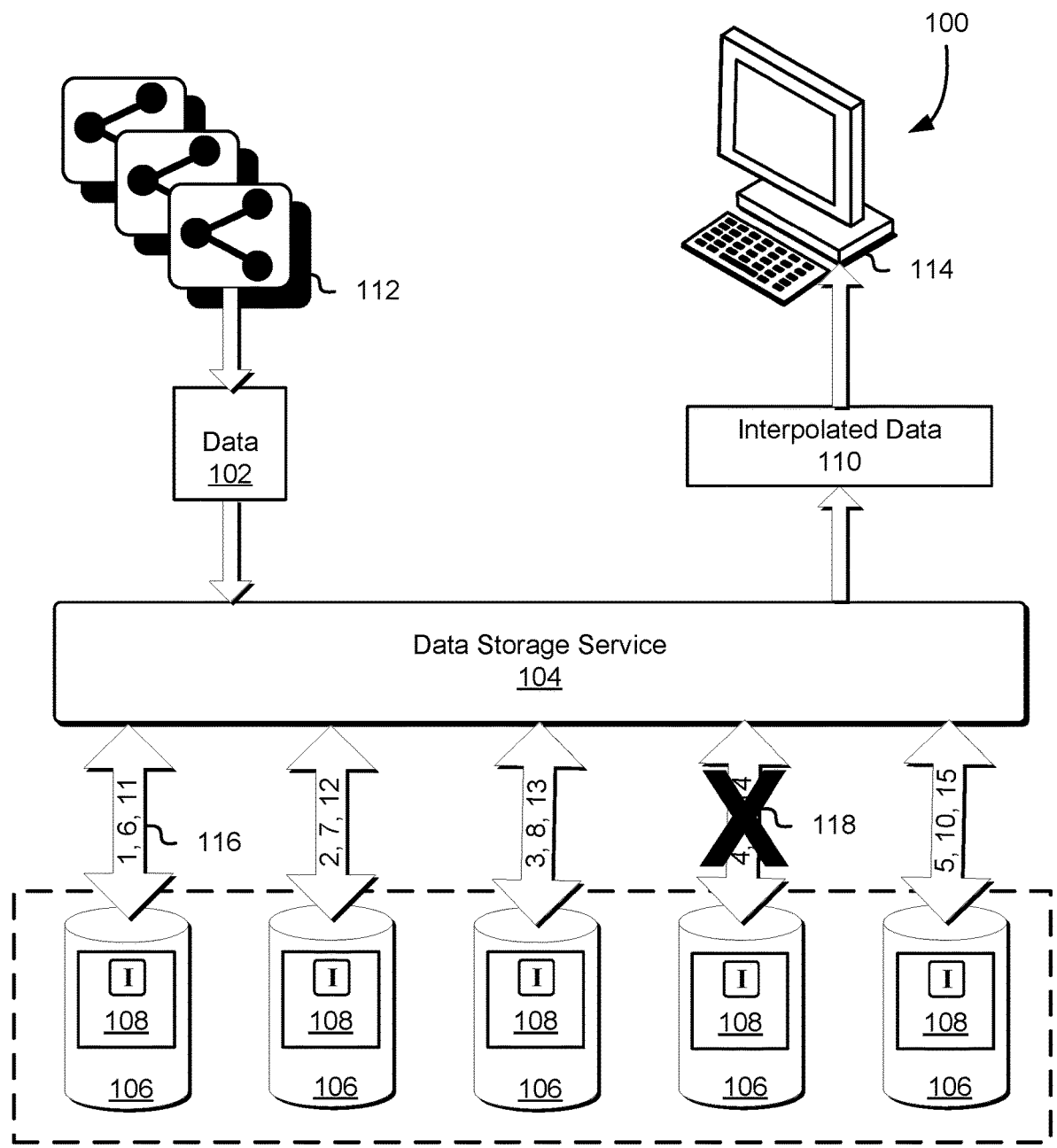
FIG. 1 illustrates an example environment in which a plurality of devices, such as sensors, store data on a sequence of volumes so as to allow for interpolated data to be returned therefrom, in accordance with some embodiments.

In one example, data, such as operational data related to the operation of various types of devices, such as sensors, is processed by a data storage system for efficient storage, retrieval, and analysis (e.g., for anomalies in the data). The data storage system may allocate a plurality of storage volumes in a sequence, which may be repeatable, to which incoming operational data is apportioned according to some parameter, such as the time at which a given subset of operational data was captured by the associated device or received by the data storage system. As a result, a given volume in a sequence holds operational data for, e.g., multiple points in time, and as may be contemplated, the operational data may be interpolated from as little as a single volume, while additional volumes may be used to attain a higher quality interpolation thereof.

Different types of operational data (e.g., sensor data) may have significance at different levels of abstraction. For example, the rate of change of a given value may be of more interest to an observer than the actual value, which may vary within a small band. As such, the interpolation techniques mentioned may be as simple as linear interpolation or extrapolation, or may be considerably more complex, and the interpolated values determined therefrom may be, for example, an nth derivative of the value in question over a specified period of time (e.g., the span of time represented on the union of the operational data on the volumes participating in the calculation.

In some embodiments, an entity, such as a customer entity associated with the devices, is provided with the data either synchronously or asynchronously with the submission of said operational data to the data storage system. The provision of the operational data to the entity may be in response to a request of the device(s), the entity, or both, or may be in the form of a "push" notification to the entity on an event, such as an alarm (e.g., sensor data value exceeding a predetermined limit), an elapsed period of time, or the receipt of an arbitrary quantum of the operational data. In some embodiments, the operational data provided to the entity is not the full complement of operational data received for the requested period of time; instead, some of the data may be interpolated from a smaller amount of the data stored, and as additional data becomes available or is requested by the requestor, the interpolation may be refined. In some cases, the interpolation is refined until no further interpolation is necessary (e.g., the full data set is available and provided to the requestor).

In some embodiments, a buffer may be implemented between, e.g., the devices and the storage volumes, and the incoming operational data may be held in the buffer for a period of time, whereupon a jitter analyzer determines whether the operational data held in the buffer has jitter or other deviations beyond a determined threshold calculated for that period of time. An anomaly score may be calculated and assigned to the quantum of data buffered in the buffer, e.g., based on the amount of jitter calculated by the jitter analyzer, and to the extent that anomaly score exceeds a given threshold, additional or different actions may be taken relative to operational data for which the detected anomaly score is not above the threshold. For example, if the anomaly score exceeds the determined threshold, a customer may be notified (e.g., an alarm) as to the nature of the anomaly, and the buffered data associated with the alarm may be stored on the volumes in such a fashion as to allow operational data (and/or derivative data) associated with the detected anomaly to be more durably retained (e.g., by spreading the anomalous values for that specific time series across multiple volumes, such that inspection of the data stored on any of those volumes makes evident that the anomaly occurred). The determined threshold may be calculated based on aspects of the incoming data (e.g., anomalies, whether specific or derivative, above or below an expected range of operation, the operation of the devices themselves, etc.), or, in some embodiments, may be set in advanced (e.g., predetermined) based on static observations, knowledge, or assumptions regarding the devices in question. In some embodiments, the threshold may instead be a range (e.g., outside of which the associated device(s) can be assumed to be functioning properly, malfunctioning, or requiring closer scrutiny), and in some of such embodiments, the range may be multilateral (e.g., a given range of values is only invalid or valid if other values associated with the device, or other devices, are within or outside of a given range or deviate/conform to a given value).

In the following description, various techniques will be described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example environment in which a plurality of devices, such as sensors, store data on a sequence of volumes so as to allow for interpolated data to be returned therefrom, in accordance with some embodiments.

Devices 112, such as sensor devices or other entities capable of transacting with a data storage service 104 (e.g., via a network), connect with a data storage service 104, so as to transact sets of data 102, such as operational data related to the operation of the devices 112, to be stored on volumes 106 durable storage associated with the data storage service 104. A customer device 114 also interacts with the data storage device 104 to receive interpolated data 110, alerts (e.g., alarms), subsets of the submitted data 102, and other information related to (and including) the data 112 from the data storage service 104.

The customer device 114 may be any computing resource or collection of such resources capable of interfacing with the data storage system, such as in a programmatic fashion (e.g., via web service call or application programming interface call), and transacting data therewith. Examples include physical computing systems (e.g., servers, desktop computers, laptop computers, thin clients, and handheld devices such as smartphones and tablets), virtual computing systems (e.g., as may be provided by the computing resource service provider using one or more resources associated therewith), hardware or software-based storage devices (such as hard drives, optical drives, solid state devices, virtual storage devices such as provided by the computing resource service provider, and the like), services (e.g., such as those accessible via application programming interface calls, web service calls, or other programmatic methods), and the like.

The devices 112 may similarly may be any computing resource or collection of such resources capable of interfacing with the data storage system, such as in a programmatic fashion (e.g., via web service call or application programming interface call), and transacting data therewith. Examples include network (e.g. Internet)-connectible devices, which may, for example, be physical objects with embedded network interface that allow the object to provide data related to its operation (i.e., "operational data," as used herein), via a network, such as the Internet. Other networks or network protocols by which the devices 112 may connect with the data storage system, either directly or indirectly, include, but are not limited to, Z-wave, Zigbee, Thread, Bluetooth, Insteon, 6LoWPAN, Highway Addressable Remote Transducer Protocol (HART), supervisory control and data acquisition (SCADA) systems, industrial fieldbus protocols used for real-time distributed control of industrial systems (such as those standardized under IEC 61158), and "sneakernet" (e.g., manual delivery of data, such as via physical delivery of data storage devices from/by the devices to the data storage system). Such interfaces or devices may include or incorporate sensors or other subdevices capable of gather information regarding the environment, operational parameters of the device to which they are associated, and the like. Other examples include physical computing systems (e.g., servers, desktop computers, laptop computers, thin clients, and handheld devices such as smartphones and tablets), virtual computing systems (e.g., as may be provided by the computing resource service provider using one or more resources associated therewith), hardware or software-based storage devices (such as hard drives, optical drives, solid state devices, virtual storage devices such as provided by the computing resource service provider, and the like), services (e.g., such as those accessible via application programming interface calls, web service calls, or other programmatic methods), and the like.

The network may be a communication network, such as the Internet, an intranet or an Internet service provider (ISP) network. Some communications from the customer device to the data storage system may cause the data storage system to operate in accordance with one or more embodiments described or a variation thereof. The front end through which the data storage service 104, as well as other services as further described herein, operates, may be any entity capable of interfacing via a network with a customer device, as well as various other components of a data storage system, so as to coordinate and/or direct data and requests to the appropriate entities. Examples include physical computing systems (e.g., servers, desktop computers, laptop computers, thin clients, and handheld devices such as smartphones and tablets), virtual computing systems (e.g., as may be provided by the computing resource service provider using one or more resources associated therewith), hardware or software-based storage devices (such as hard drives, optical drives, solid state devices, virtual storage devices such as provided by the computing resource service provider, and the like), services (e.g., such as those accessible via application programming interface calls, web service calls, or other programmatic methods), and the like.

The set of data 102, e.g., operational data related to the operation of the devices 112, may be produced by a program, process, application, module, service, or system associated with a device 112, and/or a computing resource service provider as described herein. For example, the operational data may include sensor data. As used herein, sensor data may be any data gathered by, or for, a component or device that reads and/or evaluates parameters related to the operation of the same or different component or device, and/or the environment in which the component(s) or device(s) operates. Examples of sensors include thermometers, light meters, voltmeters, ammeters, hygrometers, tachometers, chemical composition probes, pressure sensors, barometers, and the like. The set of data 112 may also be produced by a user or customer of the computing resource service provider, and submitted to the computing resource service provider via a customer device and transmitted via a network. The set of data may include volatile data, which may be added to, changed, and/or deleted from in response to, for example, one or more requests (e.g., application programming interface requests or "API requests") made by the user or customer of the computer system. The set of data may also include non-volatile data (also referred to herein as "static data"), which may be at least partially unchanging as the one or more requests are received.

The data stored across the durable storage volumes 106 may have an associated durability that may be based on, for example, an annual failure rate ("AFR") of the data storage volume or the mapped data storage volume. For a given AFR, it may be assumed that the daily failure rate ("DFR") for the data storage volume or the mapped data storage volume is the AFR divided by three-hundred and sixty-five (i.e., the number of days in a year) and the hourly failure rate ("HFR") of the data storage volume or the mapped data storage volume is the DFR divided by twenty-four (i.e., the number of hours in a day). For example, if a data storage volume or the mapped data storage volume has an AFR of 2 percent, the data storage volume or the mapped data storage volume has a DFR of 0.0055 percent and an HFR of 0.00023 percent.

When the data is migrated or otherwise stored via the data storage service 114, the data storage service 114 may store the data using one or more redundancy encoding techniques such as those described herein. For example, the data storage service 114 may encode the data by producing one or more data shards 108, 110 and may store the one or more data shards on one or more volumes of a set of volumes 106 of durable storage configured to store the redundancy encoded data as described herein. Depending on the redundancy encoding technique used by the data storage service 114, some or all of the shards stored may consist entirely of original data (identity shards) or derived data (derived shards). In some embodiments, the shards may be apportioned on a one-to-one basis to the volumes 116 of the durable storage. Accordingly, in such embodiments, some volumes may include directly readable, original data (identity shards), while others contain only derived data (derived shards). In some embodiments, only identity shards are used to store data 102 if it is detected or otherwise determined that the data 102 relates to the operation of the devices 112, and therefore subject to one or more techniques described herein.

It should be noted that, as used herein, the durability of data and/or data storage may be separate from the redundancy of the data in the data storage. For example, data stored in preliminary storage 112 may be highly durable (i.e., have a very low failure rate) but may not be redundant if, for example, it is stored as a single copy. Conversely, data stored using one or more redundancy encoding techniques such as those described herein and while such data may be less durably stored (i.e., may have fewer "9's" of durability), it may be highly redundant. For example, data stored in a grid may have no fewer than four separate copies of the data (one of the data shard, one from the horizontally-derived shards, one from the vertically-derived shards, and one from the remaining shards). If the grid is geographically distributed into, for example, multiple datacenters in multiple geographic regions, the data may have greater redundancy due to the added tolerance for loss of a complete datacenter. The techniques disclosed herein improve control over data access, such as by geographic segregation of stored shards, for data distributed in this fashion.

As may be contemplated, in embodiments where the redundancy code utilized generates or is capable of generating more shards than used in the shard set 108, 110 associated with the data 102, when shards are replaced (such as to repair unavailable shards due to corruption, power outages, and the like), other shards than those initially stored for the data may replace the initial shards.

As illustrated, operational data 102 from the devices 112 is submitted for the devices 112 to the data storage service 104 for storage and/or processing. The operational data 102 is, in some embodiments, submitted directly by the devices 112, which in some of such embodiments transact directly with the data storage service 104 by submitting data storage requests for the data 102 in a manner consistent with that described elsewhere herein, such as by the submission of the data storage request using programmatic methods. In some embodiments, the devices 112 stream the data 102 using a separate functionality from that used, such as by customer devices 114, for requesting storage of data. Such functionality may be a part of a different service or set of programmatic methods than that used for data storage requests that request the redundant and/or long-term storage of data within the data storage service, and may be intended for data where the redundancy, availability, and/or retention of the subject data is less than that of other functionality provided by the data storage service 104.

The operational data 102 is, in some embodiments, processed by the data storage service 104 for analysis and storage thereof. As illustrated, the operational data 102 is apportioned to a set of volumes 106, each of which is selected for being associated with an identity shard 108 from which data stored thereon may be read directly. The selected set of volumes may be set in a fixed or variable sequence in which data stored thereto is apportioned based on one or more parameters, which may include the time at which the data 102 was received by the data storage service 104, the time at which the data 102 was captured by the devices 112, the specific device(s) or device type(s) to which the data is associated, a customer to which the data is associated, and the like. In one example, the time (either at which the data was captured by the device(s) 112 or received by the data storage service 104) is the primary parameter in which a given set (or subset) of the operational data 112 is apportioned 116. In this example, the sequence of volumes in which the data is stored is repeated for each timeslice of the data, such that after repetition, a given volume includes multiple timeslices spread over a period of time.

In some embodiments, the data may be apportioned to the volumes in hierarchical fashion. For example, the volumes may be arranged in a tree-like structure to which the data may be apportioned, and retrieval of a given set of data resident on a volume at one level of hierarchy may inherit all other data stored at lower levels of the hierarchy. As another example, specific types of data (e.g., associated with a given type of sensor) may be apportioned to specified volumes in a way that allows some or all of the associated data of a given type to be stored on a subset of volumes. This concept may incorporate the hierarchical organization just described, and the way in which the hierarchy is structured (and the way in which the data is apportioned) may depend on a number of factors, including the relative sensitivity, importance, criticality, volume, or some other aspect associated with the apportioned data or sensor/device type.

In some embodiments, such as in response to a request for the operational data 102 and/or for information related to the stored operational data 102 (e.g., for interpolated data 110 or a summary of the stored data), the data storage service 104 processes the data stored on a subset of the volumes in the sequence so as to derive information regarding the stored data. For example, data 102 stored on one or more volumes is used to interpolate or otherwise approximate the full set of data 102 stored on the sequence of volumes 106. As illustrated, if the data includes timeslices 1 through 15, one or more volumes (e.g., the first illustrated volume having timeslices 1, 6, and 11) is used to reconstruct or interpolate the remainder of the data stored in the data series. Any interpolation method can be used, including linear interpolation, polynomial interpolation, and the like. As may be contemplated, in the event that one or more of the volumes becomes unavailable 118, the recovery thereof may not be necessary if sufficient other data on other volumes 106 is available to approximate the data stored on the unavailable volume 106, or that of the overall data set 112.

Another way in which the mechanisms described may be used is to improve the response time to requests for information regarding the stored data 112, by using an initially small amount of the stored data (e.g., the first volume 106 having data sets 1, 6, 11) in initial response to the request. If the request remains open or if an additional request for more granular data is submitted, additional volumes 106 may be read so as to refine the interpolated data using additional actual data stored thereon, in some cases up to the limit of all of the available data.

Figure 2:
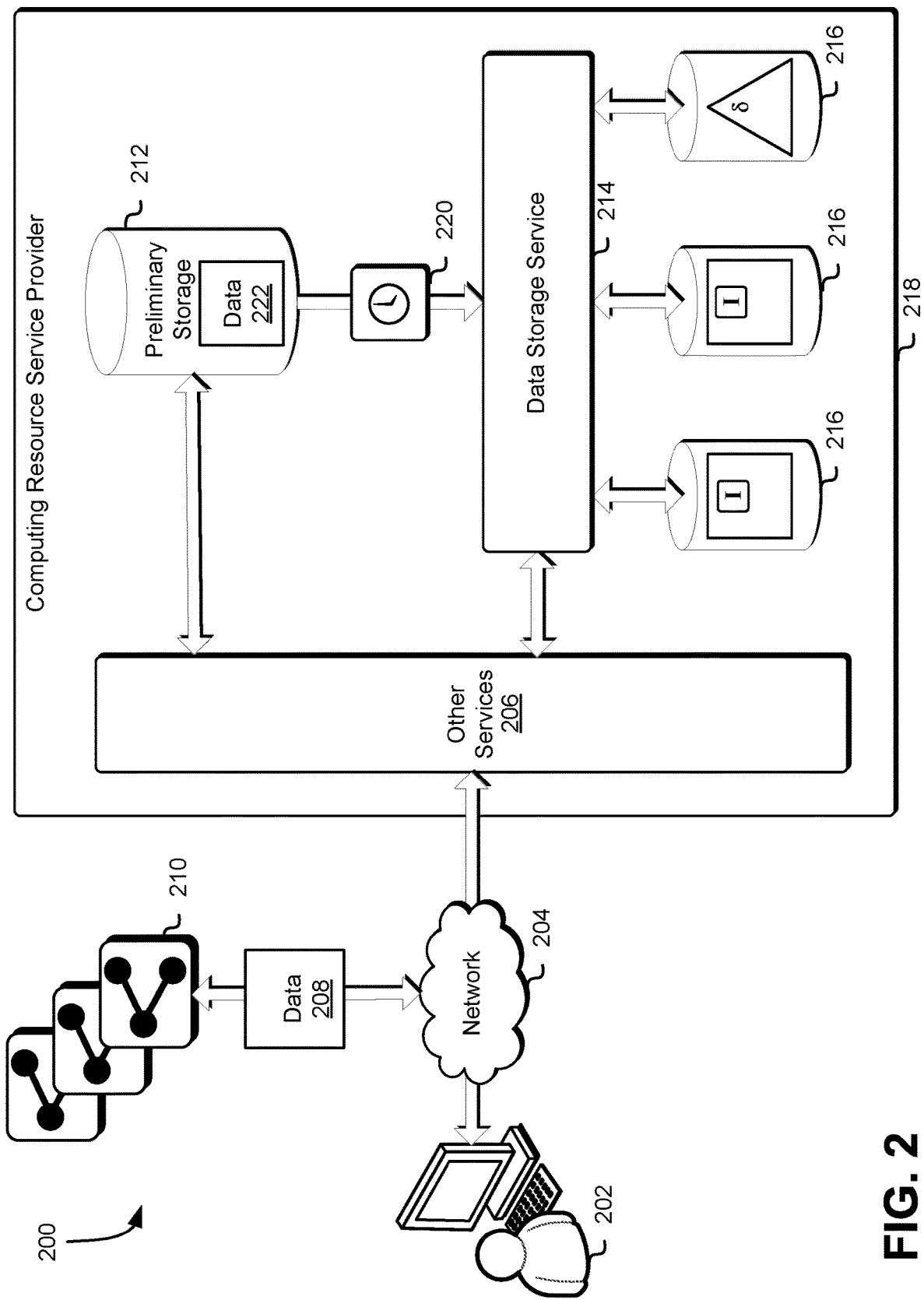
FIG. 2 illustrates an example environment in which a computing resource service provider implements a sequence of volumes within a data storage service to store data from devices connected therewith, in accordance with some embodiments.

FIG. 2 illustrates an example environment in which a computing resource service provider implements a key management service and geographical diversity to control access to data stored and transacted therewith, in accordance with some embodiments.

A customer, via a customer device 202, may connect via a network 204 to one or more services 206 provided by a computing resource service provider 218. In some embodiments, the computing resource service provider 218 may provide a distributed, virtualized and/or datacenter environment within which one or more applications, processes, services, virtual machines, and/or other such computer system entities may be executed. In some embodiments, the customer may be a person, or may be a process running on one or more remote computer systems, or may be some other computer system entity, user, or process. The customer device 202 and the network 204 may be similar to that described in connection with at least FIG. 1 above.

The command or commands to connect to the computer system instance may originate from an outside computer system and/or server, or may originate from an entity, user, or process on a remote network location, or may originate from an entity, user, or process within the computing resource service provider, or may originate from a user of the customer device 202, or may originate as a result of an automatic process or may originate as a result of a combination of these and/or other such origin entities. In some embodiments, the command or commands to initiate the connection to the computing resource service provider 218 may be sent to the services 206, without the intervention of the user of the services 206. The command or commands to initiate the connection to the services 206 may originate from the same origin as the command or commands to connect to the computing resource service provider 218 or may originate from another computer system and/or server, or may originate from a different entity, user, or process on the same or a different remote network location, or may originate from a different entity, user, or process within the computing resource service provider, or may originate from a different user of the customer device 202, or may originate as a result of a combination of these and/or other such same and/or different entities.

The customer device 202 and other devices (e.g., sensor devices) 210 may request connection to the computing resource service provider 218 via one or more connections and, in some embodiments, via one or more networks 204 and/or entities associated therewith, such as servers connected to the network, either directly or indirectly. The customer device 202 and/or other devices 210 that request access to the services 206 may, as previously discussed, include any device that is capable of connecting with a computer system via a network, including at least servers, laptops, mobile devices such as smartphones or tablets, other smart devices such as smart watches, smart televisions, set-top boxes, video game consoles and other such network-enabled smart devices, distributed computer systems and components thereof, abstracted components such as guest computer systems or virtual machines and/or other types of computing devices and/or components. The network 204, also as previously discussed, may include, for example, a local network, an internal network, a public network such as the Internet, or other networks such as those listed or described herein. The network may also operate in accordance with various protocols such as those listed or described herein.

The computing resource service provider 218 may provide access to one or more host machines as well as provide access to services such as virtual machine (VM) instances, automatic scaling groups, or file-based database storage systems as may be operating thereon. The services 206 may connect to or otherwise be associated with one or more storage services such as those described herein (e.g., the data storage service 214). The storage services may be configured to provide data storage for the services 206. In an embodiment, the computing resource service provider 218 may provide direct access to the one or more storage services for use by users and/or customers of the computing resource service provider. The storage services may manage storage of data on one or more block storage devices and/or may manage storage of data on one or more archival storage devices such as, for example, magnetic tapes.

For example, the computing resource service provider 218 may provide a variety of services 206 to the customer device 202 and/or other devices 210, which may in turn communicate with the computing resource service provider 218 via an interface, which may be a web service interface, application programming interface (API), user interface, or any other type of interface. The services 206 provided by the computing resource service provider 218 may include, but may not be limited to, a virtual computer system service, a block-level data storage service, a cryptography service, an on-demand data storage service, a notification service, an authentication service, a policy management service, an archival storage service, a durable data storage service such as the data storage service 214, and/or other such services. Each of the services 206 provided by the computing resource service provider 218 may include one or more web service interfaces that enable the customer device 202 and/or other devices 210 to submit appropriately configured API calls to the various services through web service requests. In addition, each of the services may include one or more service interfaces that enable the services to access each other (e.g., to enable a virtual computer system of the virtual computer system service to store data in or retrieve data from the on-demand data storage service or the data storage service 214, and/or to access one or more block-level data storage devices provided by the block-level data storage service).

The block-level data storage service may comprise one or more computing resources that collectively operate to store data for a user using block-level storage devices (and/or virtualizations thereof). The block-level storage devices of the block-level data storage service may, for example, be operationally attached to virtual computer systems provided by a virtual computer system service to serve as logical units (e.g., virtual drives) for the computer systems. A block-level storage device may enable the persistent storage of data used or generated by a corresponding virtual computer system where the virtual computer system service may be configured to only provide ephemeral data storage.

The computing resource service provider 218 may also include an on-demand data storage service. The on-demand data storage service may be a collection of computing resources configured to synchronously process requests to store and/or access data. The on-demand data storage service may operate using computing resources (e.g., databases) that enable the on-demand data storage service to locate and retrieve data quickly, to allow data to be provided in response to requests for the data. For example, the on-demand data storage service may maintain stored data in a manner such that, when a request for a data object is retrieved, the data object can be provided (or streaming of the data object can be initiated) in a response to the request. As noted, data stored in the on-demand data storage service may be organized into data objects. The data objects may have arbitrary sizes except, perhaps, for certain constraints on size. Thus, the on-demand data storage service may store numerous data objects of varying sizes. The on-demand data storage service may operate as a key value store that associates data objects with identifiers of the data objects that may be used by the user to retrieve or perform other operations in connection with the data objects stored by the on-demand data storage service.

Note that, unless otherwise specified, use of expressions regarding executable instructions (also referred to as code, applications, agents, etc.) performing operations that instructions do not ordinarily perform unaided (e.g., transmission of data, calculations, etc.) in the context of describing disclosed embodiments denote that the instructions are being executed by a machine, thereby causing the machine to perform the specified operations.

The services 206 may produce data 208, such as data received from the customer device 202 and/or other devices 210, which may be stored in the preliminary storage 212 as described above. In some embodiments, as previously mentioned, the data stored in the preliminary storage may be stored in unaltered form, such as in an identity shard. While the data is stored in the preliminary storage 212, the data 208 may be accessed by the services 206 (e.g., as a result of one or more API requests by the customer device 202) from the preliminary storage 212. After a determined period 220, such as described above in connection with FIG. 1, has passed and the data is migrated to a data storage service 214 provided by the computing resource service provider 218, the data may be accessed using the data storage service 214. In an embodiment where the data 208 may be stored using redundancy encoding technique such as those described herein, the data storage service 214 may retrieve the data from any of the data volumes 216 and/or may reconstruct the data using the redundancy encoding techniques. The data volumes 216 may be magnetic tape, may be optical disks, or may be some other such storage media. As previously discussed and as further discussed herein, the data may be stored in identity shards that correspond individually to volumes, and may also be processed (using the redundancy encoding techniques) so as to create derived shards. Also as previously discussed, the data 208 may be stored only in identity shards.

The data storage service 214 may store the data 208 in the preliminary storage 212 or may transmit a command that causes a different service (e.g., a block storage service or some other storage service such as those described herein) to store the data 208 in the preliminary storage 212. The data storage service 214 may also cause the data to be migrated from the preliminary storage 212 or may transmit a command that causes a different service to cause the data to be migrated from the preliminary storage 212. The data storage service 214 may also transmit a command or commands to cause a different service to perform other operations associated with making data objects eventually durable including, but not limited to, storing the data objects in the data shards, calculating derived shards, updating bundles, updating grids (i.e., updating horizontal, vertical, and other bundles of multiply bundled data), and/or other such operations.

In an embodiment, the preliminary storage 212 is a data storage volume such as, for example, a magnetic disk drive (e.g., a spinning disk drive or a solid state disk drive), computer system memory, magnetic tape, or some other optical storage device. In another embodiment, the preliminary storage 212 is a virtual and/or shared data storage volume that is mapped to a physical storage volume such as, for example, a disk drive, a solid state disk drive, computer system memory, magnetic tape, or some other optical storage device. As may be contemplated, the types of data storage volumes used for the preliminary storage 212 described herein are illustrative examples and other types of data storage volumes used for the preliminary storage 106 may be considered as within the scope of the present disclosure.

In an embodiment, the preliminary storage 212 is a plurality of storage devices that are used to redundantly store the data using techniques such as, for example, bundle encoding, grid encoding, or replicated storage. For example, the preliminary storage 212 may store the data by distributing the data to a plurality of data shards (e.g., putting a first portion of the data in a first data shard and a second portion of the data in a second data shard) and generating one or more derived shards based on those data shards. In another embodiment, the preliminary storage 112 is one or more storage devices that store redundant copies of the data as received. In yet another embodiment, the preliminary storage uses a combination of the storage techniques described herein by, for example, storing a single copy of the data for a first time period (e.g., thirty minutes), storing multiple copies of the data for a second time period (e.g., one day), using redundant storage techniques such as grid or bundle encoding to store the data for a third time period (e.g., thirty days), and then moving the data to more durable storage 216 using the data storage service 214 as described herein.

The set of data may be stored in the preliminary storage 212 in an unaltered form (e.g., not processed, compressed, indexed, or altered prior to storage). The set of data may also be stored in the preliminary storage 212 as, for example, original data (also referred to herein as an "identity shard") such as the original data shards described herein. In an embodiment, the set of data stored in the preliminary storage 212 is stored without indexing and without any redundancy encoding. In another embodiment, the set of data stored in the preliminary storage 212 is stored with null redundancy encoding (i.e., a redundancy encoding that maps the data to itself). The data in preliminary storage may be stored as raw data, or may be bundle-encoded, or may be grid-encoded, or may be stored using some other method.

In an embodiment, data can be migrated from preliminary storage to the data storage service 212 as a result of an event such as, for example, a request by a customer or by a device (e.g., 202, 210) to store the data 208 in the data storage service 214. Other events may also be used to cause the migration of the data from preliminary storage 212 to the data storage service 214 such as, for example, events generated by a process, module, service, or application associated with the customer or associated with a computing resource service provider. In an illustrative example, a block storage service may maintain data storage in preliminary storage for a running virtual machine instance and, upon termination of the instance, may generate an event to migrate some or all of the data from preliminary storage to durable storage. The triggering event that causes the migration of data from preliminary storage may also be combined with an elapsed time as described above so that, for example, data may be stored in preliminary storage until an event occurs, but the data may also be migrated from preliminary storage if no event occurs prior to the elapsed time. As may be contemplated, the criteria for initiating the migration from preliminary storage described herein are illustrative examples and other such criteria for initiating the migration from preliminary storage may be considered as within the scope of the present disclosure.

As used herein, the durability of a data object may be understood to be an estimate of the probability that the data object will not unintentionally become permanently irretrievable (also referred to herein as "unavailable"). This durability is an estimated probability and is generally expressed as a percentage (e.g., 99.9999 percent). This durability is based on assumptions of probabilities of certain failures (e.g., the AFR of drives used to store the data) and may be based on an average failure rate, a maximum failure rate, a minimum failure rate, a mean failure rate, or some other such failure rate. The durability may be based on a statistical average of the failure over a collection of drives when there are many different drives and/or when there are many different types of drives. The durability may also be based on historical measurements of the failure of drives and/or statistical sampling of the historical measurements of the failure of drives. The durability may also be correlated with the probability that a data object will not unintentionally become unavailable such as, for example, basing the durability on the probability that a data object will unintentionally become unavailable. As may be contemplated, the methods of determining durability of data described herein are merely illustrative examples and other such methods of determining durability of data may be considered as within the scope of the present disclosure.

In an embodiment, a separate service can be configured to monitor the elapsed time associated with the data objects in preliminary storage 212 and, based on a desired durability, cause the data storage service 214 to cause the data to be migrated from the preliminary storage 212 to the durable storage by, for example, transmitting a message to the data storage service. This separate service may operate asynchronously to enforce time limits for all such data stored in preliminary storage.

Figure 3:
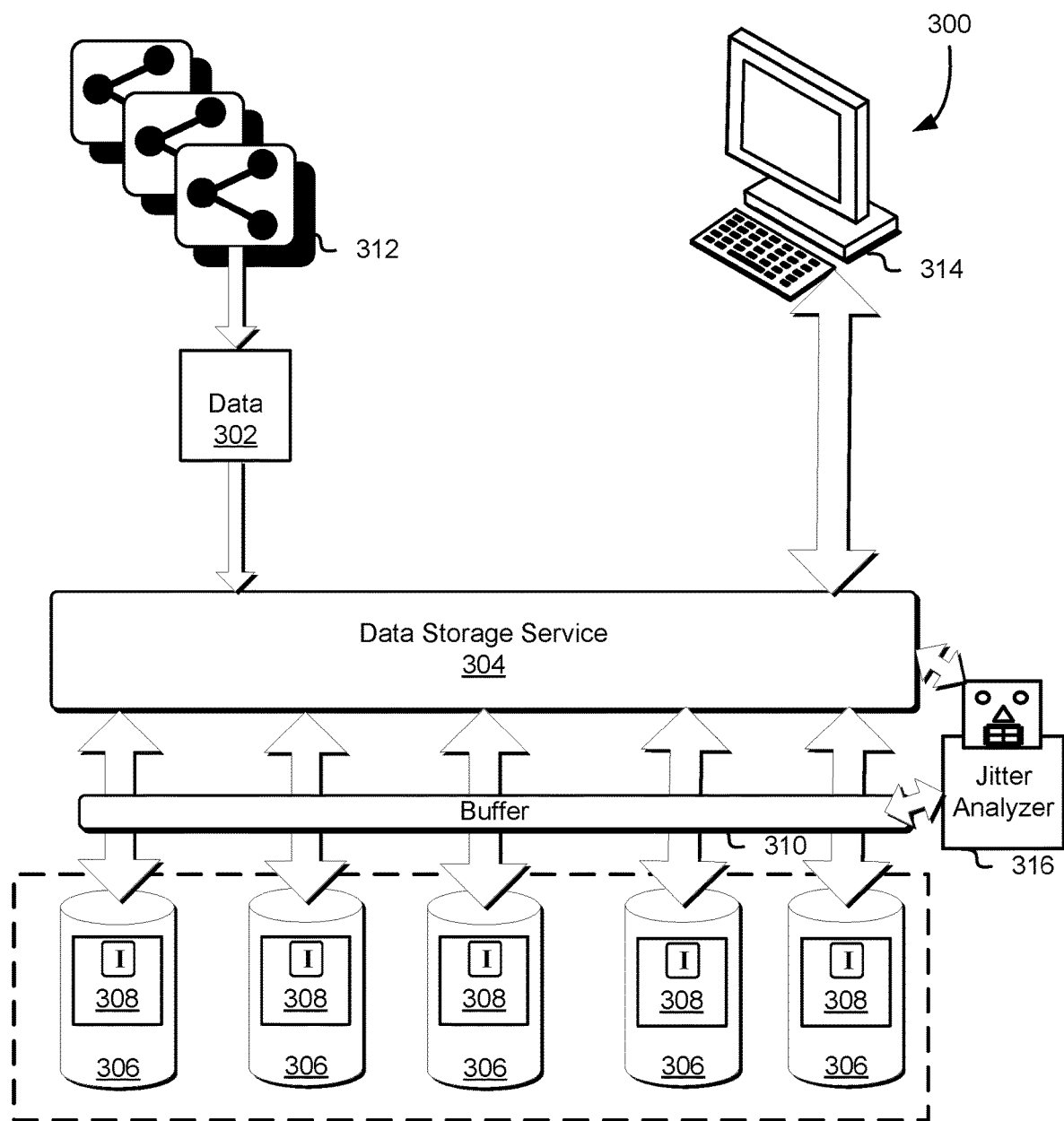
FIG. 3 illustrates an example environment implementing a buffer and a jitter analyzer to detect anomalies in data, such as operational data, from connected devices, in accordance with some embodiments.

FIG. 3 illustrates an example environment implementing a buffer and a jitter analyzer to detect anomalies in data, such as operational data, from connected devices, in accordance with some embodiments. Similarly to described in connection with FIGS. 1 and 2 above, operational data 302 related to the operation of device(s) 312 may be transacted, either by the device(s) themselves or at the behest of a different device, such as customer device 314, with a data storage service 304. Also as previously described in connection with FIGS. 1 and 2, the data storage service 304 may store the data 312 in a sequence of volumes 306 for storage in a plurality of shards 308, which may be identity shards.

In connection with receiving the data 302, the data storage service may process the incoming data 302 so as to determine whether the incoming data 302 contains anomalies relative to, e.g., baseline (reference) data, which may include predetermined values (e.g., above and/or below which a given sensor value would be considered abnormal). The incoming data 302 is buffered in a buffer 310 for a period of time, the length of which may be fixed or variable and selected by the data storage service 304 and/or a customer thereof. While the data is buffered, a jitter analyzer 316 analyzes the buffered data to determine whether it includes any anomalies relative to the baseline data.

The jitter analyzer 316 may be any device or entity that is capable of processing data to make determinations regarding its contents. For example, the jitter analyzer 316 may include one or more computer systems or resources thereof, whether physical resources or virtual resources (e.g., as may be abstracted from physical resources). The buffer 310 may be any device or entity that is capable of storing data for a period of time, and transact such data with other components, such as the jitter analyzer 316 or volumes 306.

The jitter analyzer 316, in some embodiments, analyzes the buffered data 310 by determining a level of jitter of the values associated with the data contained within. The jitter analyzer 316 may accomplish this by, for example, determining a rate of change of the values over a period of time associated with the buffered data and compare that rate of change to a reference value. As another example, the jitter analyzer 316 may perform a Fourier transform, such as by applying a fast Fourier transform to the buffered data set, to determine the frequency content of the buffer data and compare the resultant spectrum to one or more baseline values, above and/or below which an anomaly in the data is considered to have occurred.

Furthermore, the jitter analyzer 316 may calculate an anomaly score that enumerates a relative level of abnormality in the buffered data. The anomaly score may have a linear, logarithmic, direct, inverse, or other relationship with a level of abnormality (e.g., jitter) detected for a given set of buffered data. The anomaly score may be independently calculated for each buffered subset of data, or, in some embodiments, the anomaly score calculated for a given subset of buffered data may be influenced by the anomaly scores or other characteristics of other subsets of the data buffered at other times. In some embodiments, a reference or baseline anomaly score may be set (e.g., predetermined), such that a level at or below that baseline anomaly score (e.g., corresponding to some detected level of abnormality that may be considered tolerable) does not alter or initiate other data processing or storage measures for the buffered data beyond a nominal set of operations intended for data for which abnormalities are not detected.

However, in some embodiments, if a detected anomaly score is at or higher than the predetermined baselines, the data storage service is directed (e.g., by the jitter analyzer) to store different or additional information related to the detected anomaly, the buffered data, or both. For example, if the anomaly score determined by the jitter analyzer is above the determined threshold, the buffered data may be apportioned to the sequence of volumes in a way that allows multiple volumes to include the associated portions of the buffered data causing the abnormalities. In some of such embodiments, when the data from a volume is interpolated according to the described techniques, the interpolated data will appear anomalous.

As another example, derivative information, e.g., metadata, regarding the anomaly, may be stored along with the buffered data when the buffered data is flushed from the buffer into the volumes. Such metadata may include the anomaly score, the nature of the anomaly, specific values and parameters suspected to have caused the anomaly, and the like. Such derivative information may be stored on multiple volumes of the sequence of the volumes so as to best preserve information related to the anomaly in the case that one or more of the volumes becomes available, or if a low-resolution interpolation or alert is requested or generated. Furthermore, in some embodiments, if an anomaly is detected, the data storage service and/or the jitter analyzer may send information regarding the detected anomaly (e.g., an alarm, related values and/or parameters such as the anomaly score, and the like) to an external device, such as a customer device, as previously discussed.

Figure 4:
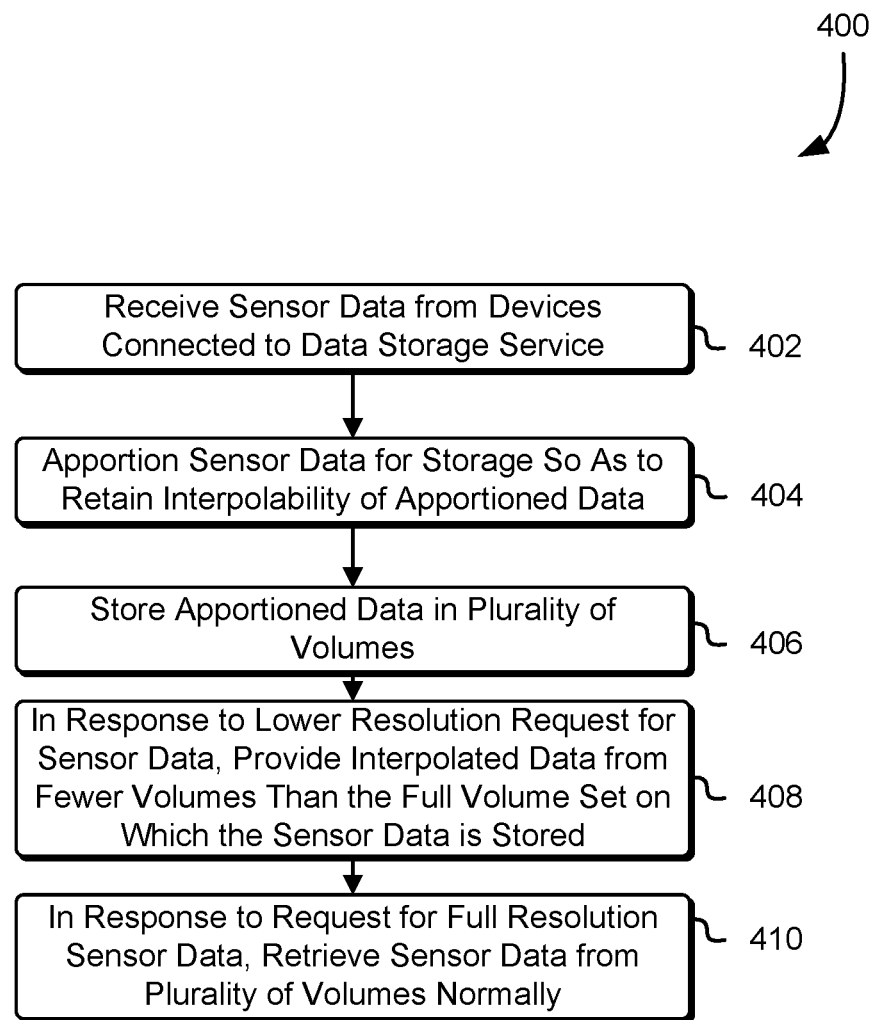
FIG. 4 illustrates an example process for storing sensor data and providing interpolated data related therewith, in accordance with some embodiments.

FIG. 4 illustrates an example process for storing sensor data and providing interpolated data related therewith, in accordance with some embodiments.

At step 402, an entity, such as a component of the data storage service as previously discussed, receives operational data, such as sensor data, from a set of devices connected to the data storage service for processing and storage in accordance with the techniques discussed in connection with at least FIGS. 1 and 2. As previously mentioned, the connected devices may include sensors or collections of sensors, and may be under the control of a different entity, such as a customer device as previously described.

At step 404, the incoming operational data is apportioned to volumes of a sequence of volumes, such that data stored on one or more volumes of the sequenced may be used to interpolate or otherwise approximate the sensor data stored over the entire sequence, using techniques discussed in connection with at least FIGS. 1 and 2 above. For example, the sequence may be fixed, variable, or rolling, as previously discussed.

At step 406, the data is stored according to the apportionment sequence calculated in step 404. As discussed, the volumes selected for the sequence may exclude derived shards and only consist of identity shards. At step 408, in response to a lower resolution request by, e.g., a customer device, for initial and/or lower accuracy information related to the stored operational data (or for the data itself), the data storage system retrieves data stored on one or more volumes of the sequence, but less than the full sequence, and performs interpolation or other approximation methods on that data so as to approximate the requested data. At step 410, if a full data request (e.g.,) is received, data on all available volumes in the sequence are retrieved so as to provide the full data set received to the requestor.

Figure 5:
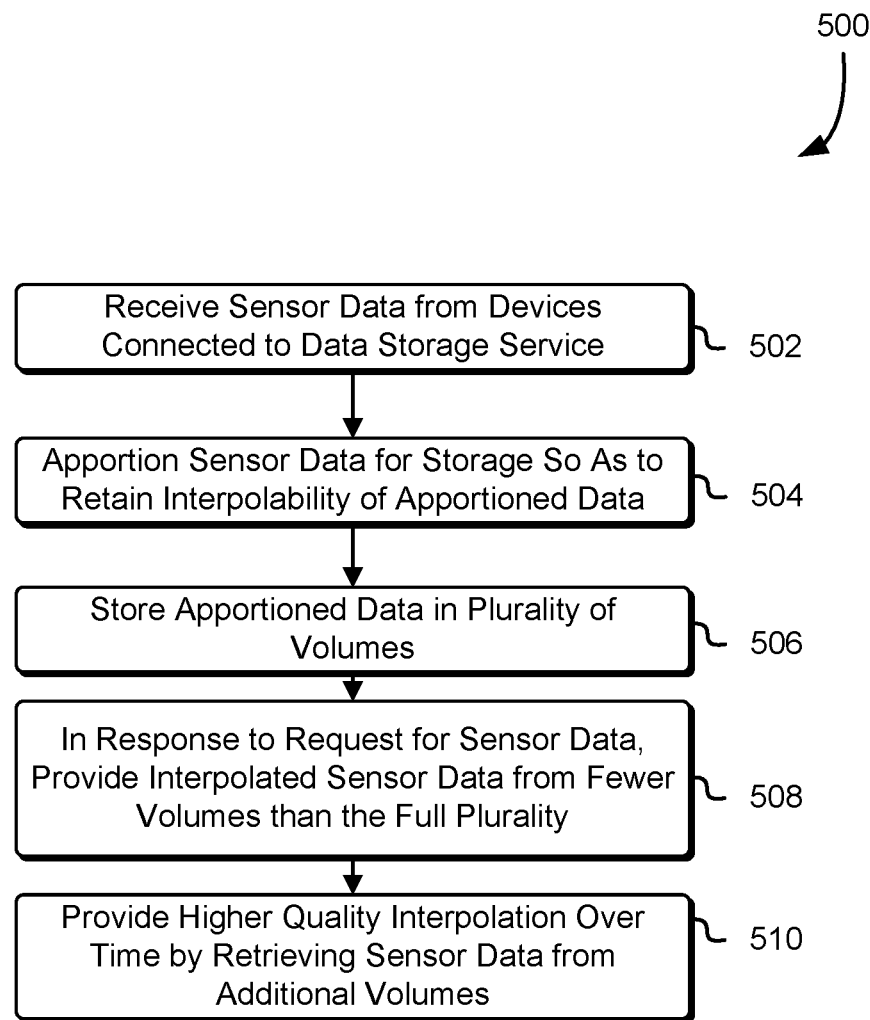
FIG. 5 illustrates an example process for storing sensor data so as to provide progressively refined interpolations of such data, in accordance with some embodiments.

FIG. 5 illustrates an example process for storing sensor data so as to provide progressively refined interpolations of such data, in accordance with some embodiments.

At step 502, an entity, such as a component of the data storage service as previously discussed, receives operational data, such as sensor data, from a set of devices connected to the data storage service for processing and storage in accordance with the techniques discussed in connection with at least FIGS. 1 and 2. As previously mentioned, the connected devices may include sensors or collections of sensors, and may be under the control of a different entity, such as a customer device as previously described.

At step 504, the incoming operational data is apportioned to volumes of a sequence of volumes, such that data stored on one or more volumes of the sequenced may be used to interpolate or otherwise approximate the sensor data stored over the entire sequence, using techniques discussed in connection with at least FIGS. 1 and 2 above. For example, the sequence may be fixed, variable, or rolling, as previously discussed.

At step 506, the data is stored according to the apportionment sequence calculated in step 504. As discussed, the volumes selected for the sequence may exclude derived shards and only consist of identity shards. At step 508, in response to a lower resolution request by, e.g., a customer device, for initial and/or lower accuracy information related to the stored operational data (or for the data itself), the data storage system retrieves data stored on one or more volumes of the sequence, but less than the full sequence, and performs interpolation or other approximation methods on that data so as to approximate the requested data. At step 510, if the request remains open or a supplemental request for higher resolution data is requested, additional data on further available volumes in the sequence are retrieved so as to refine the approximation generated in connection with step 508, up to the full data set (e.g., stored across the full sequence of volumes received to the requestor.

Figure 6:
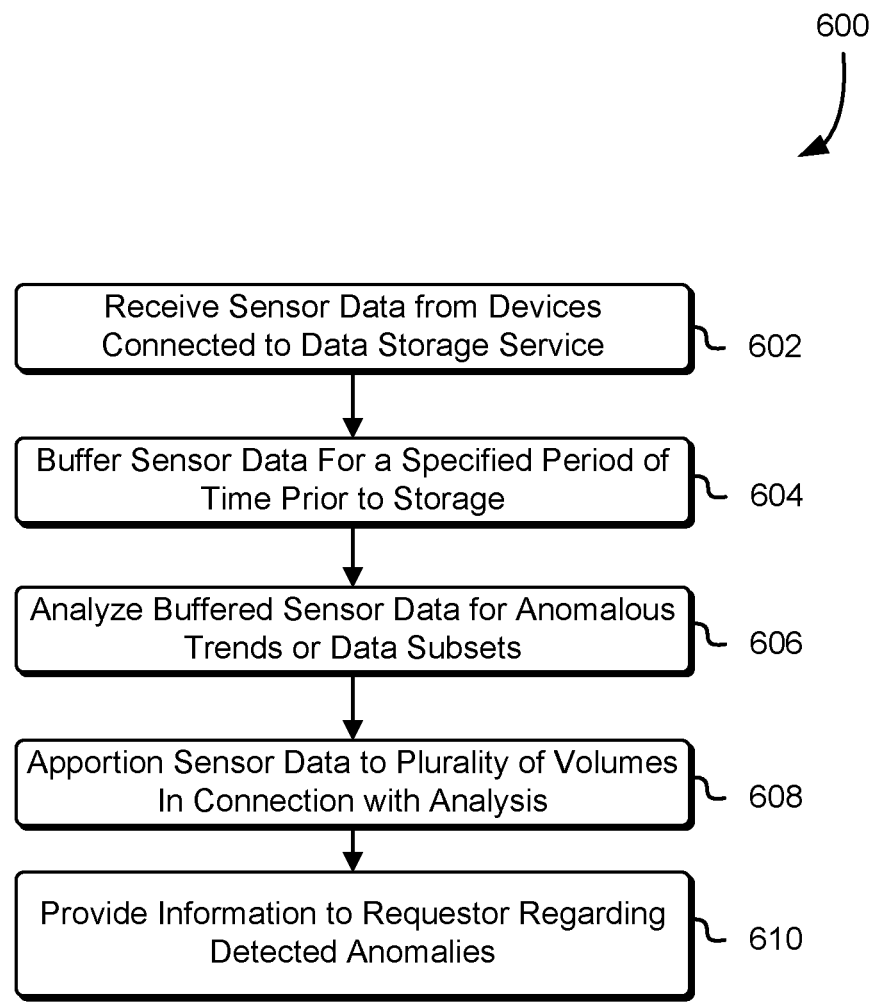
FIG. 6 illustrates an example process for processing incoming sensor data so as to analyze the sensor data for anomalies, in accordance with some embodiments.

FIG. 6 illustrates an example process for processing incoming sensor data so as to analyze the sensor data for anomalies, in accordance with some embodiments.

At step 602, an entity, such as a component of the data storage service as previously discussed, receives operational data, such as sensor data, from a set of devices connected to the data storage service for processing and storage in accordance with the techniques discussed in connection with at least FIGS. 1 and 2. As previously mentioned, the connected devices may include sensors or collections of sensors, and may be under the control of a different entity, such as a customer device as previously described.

As the data is received in connection with step 602, prior to being stored according to the processes described above, e.g., in FIGS. 1-5, the data is buffered for a specified period of time, such as in a buffer implemented or connected to the data storage service. The period of time may be adjusted by, e.g., the customer associated with the data, an entity of the data storage system, or some combination thereof, according to one or more parameters, including the contents of the data, the quantity of data, a desired accuracy for the analysis of the data, system load, and the like.

At step 606, the buffered sensor data is analyzed, such as by a jitter analyze, for anomalous trends or other markers in the data relative to the period of time for which the data is the buffered, or relative to other data sets buffered at other times. As previously discussed, the analysis may include Fourier transforms, comparisons against baseline values, and the like.

At step 608, as previously discussed in connection with at least FIG. 3, information related to the analysis is stored in accordance with the result of the analysis. For example, the data may be stored in a different manner if an anomaly is detected, so as to improve the durability of the information related to the anomaly. If such an anomaly occurs, one or more entities, such as customer devices, may be provided information regarding the occurrence and/or nature of the detected anomaly.

Figure 7:
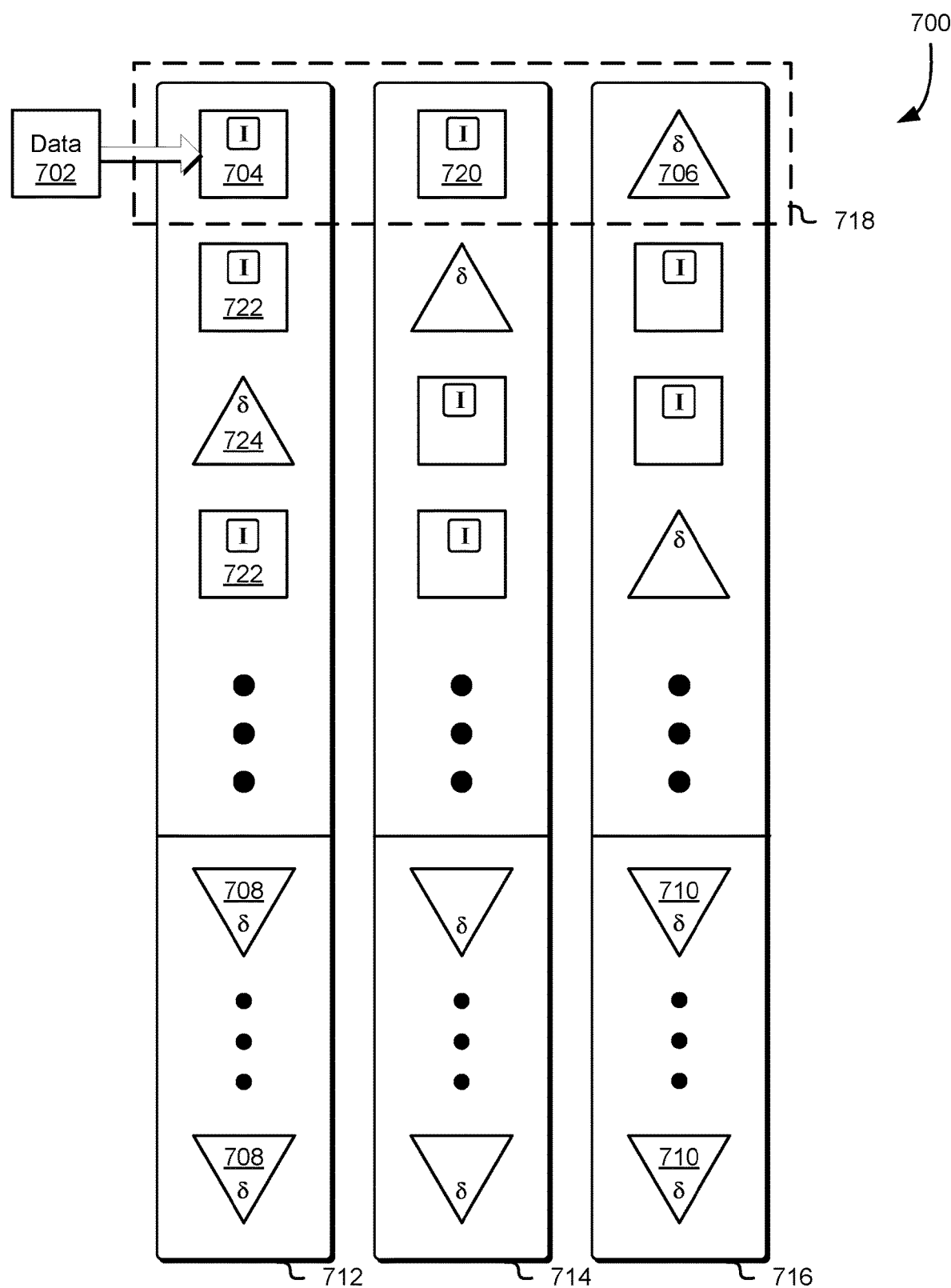
FIG. 7 illustrates an example environment where a redundancy encoding technique is applied to data stored in durable storage in accordance with at least one embodiment.

FIG. 7 illustrates an example environment 700 where a redundancy encoding technique is applied to data stored in durable storage as described in connection with FIG. 1 and in accordance with an embodiment. The redundancy encoding technique illustrated in FIG. 7 is an example of a grid encoding technique wherein each identity shard is part of a first set of one or more identity shards which may be bundled with one or more derived shards in a first group or bundle (i.e., in one dimension or direction) and each identity shard is also part of at least a second set of one or more identity shards which may be bundled with one or more other derived shards in a second bundle or group (i.e., in a second dimension or direction). As is illustrated in FIG. 7, a grid encoding technique is often implemented as a two-dimensional grid, with each shard being part of two bundles (i.e., both "horizontal" and "vertical" bundles). However, a grid encoding technique may also be implemented as a three-dimensional grid, with each shard being part of three bundles, or a four-dimensional grid, with each shard being part of four bundles, or as a larger-dimensional grid. Additional details of grid encoding techniques are described in U.S. patent application Ser. No. 14/789,783, filed Jul. 1, 2015, entitled "GRID ENCODED DATA STORAGE SYSTEMS FOR EFFICIENT DATA REPAIR," which is incorporated by reference herein.

In the example illustrated in FIG. 7, data 702 from preliminary storage is provided for storage in durable storage using a redundancy encoding technique with both horizontal derived shards and vertical derived shards. In the example illustrated in FIG. 7, a first datacenter 712 may contain data shards (denoted as a square shard with the letter "I"), horizontal derived shards (denoted as a triangular shard with the Greek letter "δ" or delta), and vertical derived shards (denoted as an inverted triangle with the Greek letter "δ") all of which may be stored on durable storage volumes within the first datacenter 712. A second datacenter 714, which may be geographically and/or logically separate from the first datacenter 712, may also contain data shards, horizontal derived shards, and/or vertical derived shards. A third datacenter 716, which may be geographically and/or logically separate from the first datacenter 712 and from the second datacenter 714, may also contain data shards, horizontal derived shards, and/or vertical derived shards. As illustrated in FIG. 7, each of the three datacenters may be a single vertical bundle. In an embodiment, each of the datacenters can include multiple vertical bundles. As may be contemplated, the number of datacenters illustrated in FIG. 7 and/or the composition of the datacenters illustrated in FIG. 7 are merely illustrative examples and other numbers and/or compositions of datacenters may be considered as within the scope of the present disclosure. The datacenters may be co-located or may be located in one or more separate datacenter locations.

In the example illustrated in FIG. 7, the data 702 may be copied to a data shard 704 and, as a result of the change to the data in the data shard 704, a horizontal derived shard 706 associated with the data shard 704 may be updated so that the horizontal derived shard 706 may be used to reconstruct the data shard 704 in the event of a loss of the data shard 704. In the example illustrated in FIG. 7, the three shards enclosed by the dotted line (e.g., the data shard 704, the data shard 720, and the horizontal derived shard 706) are a horizontal bundle 718. In this example, the data shard 720 is not affected by the changes to the data shard 704 but the horizontal derived shard 706 may need to be updated as a result of the changes to the data shard 704.

Also as a result of the change to the data in the data shard 704, one or more vertical derived shards 708 related to the data shard 704 may also be updated so that the vertical derived shards 708 may be used to reconstruct the data shard 704 in the event of a loss of the data shard 704 and the horizontal derived shard 706. In the example illustrated in FIG. 7, the shards in datacenter 712 form a vertical bundle. In this example, the other data shards 722 in the vertical bundle and/or the horizontal derived shards 724 in the vertical bundle are not affected by the changes to the data shard 704 but the vertical derived shards 708 may need to be updated as a result of the changes to the data shard 704. Finally, as a result of the change to the horizontal derived shard 706, one or more vertical derived shards 710 related to the horizontal derived shard 706 in the vertical bundle in datacenter 716 may also be updated so that the vertical derived shards 710 may be used to reconstruct the horizontal derived shard 706 in the event of a loss of the horizontal derived shard 706 and the data shard 704.

Figure 8:
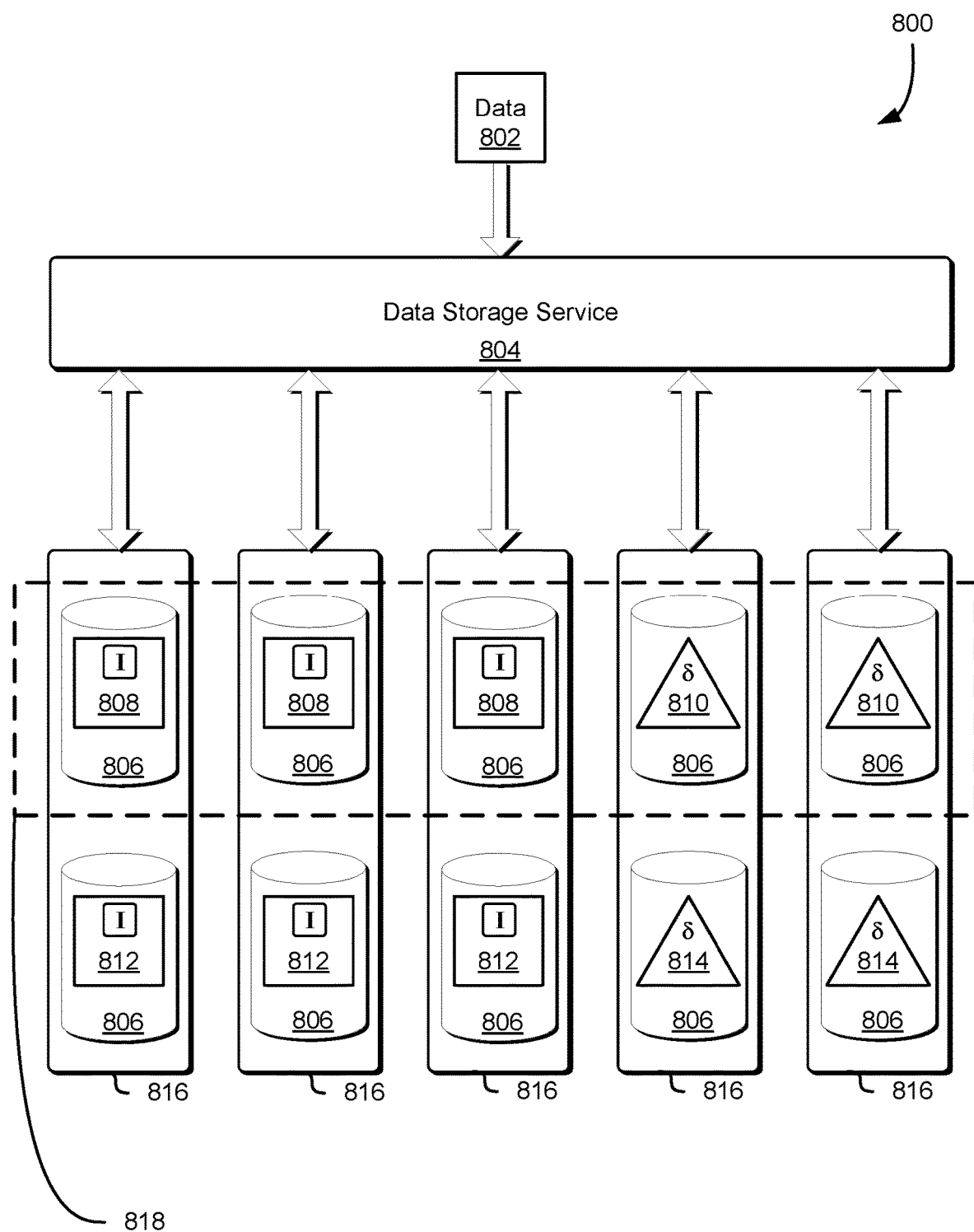
FIG. 8 illustrates an example environment where a redundancy encoding technique is applied to data stored in durable storage in accordance with at least one embodiment.

FIG. 8 illustrates an example environment 800 where a redundancy encoding technique is applied to data stored in durable storage as described in connection with FIG. 1 and in accordance with at least one embodiment. The redundancy encoding technique illustrated in FIG. 8 is an example of a bundle encoding technique wherein one or more identity shards (also referred to herein as "data shards") may be bundled with one or more derived shards in a single group or dimension. Additional details of bundle encoding techniques are described in U.S. patent application Ser. No. 14/741,409, filed Jun. 16, 2015, entitled "ADAPTIVE DATA LOSS MITIGATION FOR REDUNDANCY CODING SYSTEMS," which is incorporated by reference herein.

Data 802 from preliminary storage may be sent to a data storage system 804 for redundant storage. The data 802 may be provided from the preliminary storage by any entity capable of transacting data with a data storage system, such as over a network (including the Internet). Examples include physical computing systems (e.g., servers, desktop computers, laptop computers, thin clients, and handheld devices such as smartphones and tablets), virtual computing systems (e.g., as may be provided by the computing resource service provider using one or more resources associated therewith), services (e.g., such as those connecting to the data storage system 804 via application programming interface calls, web service calls, or other programmatic methods), and the like.

The data storage system 804 may be any computing resource or collection of such resources capable of processing data for storage, and interfacing with one or more resources to cause the storage of the processed data. Examples include physical computing systems (e.g., servers, desktop computers, laptop computers, thin clients, and handheld devices such as smartphones and tablets), virtual computing systems (e.g., as may be provided by the computing resource service provider using one or more resources associated therewith), services (e.g., such as those connecting to the data storage system 804 via application programming interface calls, web service calls, or other programmatic methods), and the like. In some embodiments, the resources of the data storage system 804, as well as the data storage system 804 itself, may be one or more resources of a computing resource service provider, such as that described in further detail below. In some embodiments, the data storage system 804 and/or the computing resource service provider provides one or more archival storage services and/or data storage services, such as those described herein, through which a client entity may provide data such as the data 802 for storage in preliminary storage and/or the data storage system 804.

Data 802 may include any quantity of data in any format. For example, the data 802 may be a single file or may include several files. The data 802 may also be encrypted by, for example, a component of the data storage system 804 after the receipt of the data 802 in response to a request made by a customer of the data storage system 804 and/or by a customer of computing resource service provider.

The data storage system 804 may sort one or more identity shards according to one or more criteria (and in the case where a plurality of criteria is used for the sort, such criteria may be sorted against sequentially and in any order appropriate for the implementation). Such criteria may be attributes common to some or all of the archives, and may include the identity of the customer, the time of upload and/or receipt (by the data storage system 804), archive size, expected volume and/or shard boundaries relative to the boundaries of the archives (e.g., so as to minimize the number of archives breaking across shards and/or volumes), and the like. As mentioned, such sorting may be performed so as to minimize the number of volumes on which any given archive is stored. Such techniques may be used, for example, to optimize storage in embodiments where the overhead of retrieving data from multiple volumes is greater than the benefit of parallelizing the retrieval from the multiple volumes. Information regarding the sort order may be persisted, for example, by the data storage system 804, for use in techniques described in further detail herein.

As previously discussed, in some embodiments, one or more indices may be generated in connection with, for example, the order in which the archives are to be stored, as determined in connection with the sorting mentioned immediately above. The index may be a single index or may be a multipart index, and may be of any appropriate architecture and may be generated according to any appropriate method. For example, the index may be a bitmap index, dense index, sparse index, or a reverse index. Embodiments where multiple indices are used may implement different types of indices according to the properties of the identity shard to be stored via the data storage system 804. For example, a data storage system 804 may generate a dense index for archives over a specified size (as the size of the index itself may be small relative to the number of archives stored on a given volume), and may also generate a sparse index for archives under that specified size (as the ratio of index size to archive size increases).

The data storage system 804 is connected to or includes one or more volumes 806 on which archives or identity shards may be stored. The generated indices for the archives may also be stored on the one or more volumes 806. The volumes 806 may be any container, whether logical or physical, capable of storing or addressing data stored therein. In some embodiments, the volumes 806 may map on a one-to-one basis with the data storage devices on which they reside (and, in some embodiments, may actually be the data storage devices themselves). In some embodiments, the size and/or quantity of the volumes 806 may be independent of the capacity of the data storage devices on which they reside (e.g., a set of volumes may each be of a fixed size such that a second set of volumes may reside on the same data storage devices as the first set). The data storage devices may include any resource or collection of resources, such as those of a computing resource service provider, that are capable of storing data, and may be physical, virtual, or some combination of the two.

As previously described, one or more indices may, in some embodiments, be generated for each volume of the plurality of volumes 806, and in such embodiments, may reflect the archives stored on the respective volume to which it applies. In embodiments where sparse indices are used, a sparse index for a given volume may point to a subset of archives stored or to be stored on that volume, such as those archives which may be determined to be stored on the volume based on the sort techniques mentioned previously. The subset of volumes to be indexed in the sparse index may be selected on any appropriate basis and for any appropriate interval. For example, the sparse index may identify the archives to be located at every x blocks or bytes of the volume (e.g., independently of the boundaries and/or quantity of the archives themselves). As another example, the sparse index may identify every nth archive to be stored on the volume. As may be contemplated, the indices (whether sparse or otherwise), may be determined prior to actually storing the archives on the respective volumes. In some embodiments, a space may be reserved on the volumes so as to generate and/or write the appropriate indices after the archives have been written to the volumes 806.

In some embodiments, the sparse indices are used in connection with information relating to the sort order of the archives so as to locate archives without necessitating the use of dense indices, for example, those that account for every archive on a given volume. Such sort order-related information may reside on the volumes 806 or, in some embodiments, on an entity separate from the volumes 806, such as in a data store or other resource of a computing resource service provider. Similarly, the indices may be stored on the same volumes 806 to which they apply, or, in some embodiments, separately from such volumes 806.

The archives may be stored, bit for bit (e.g., the "original data" of the archives), on a subset of the plurality of volumes 806. Also as mentioned, appropriate indices may also be stored on the applicable subset of the plurality of volumes 806. The original data of the archives is stored as a plurality of shards across a plurality of volumes, the quantity of which (either shards or volumes, which in some cases may have a one to one relationship) may be predetermined according to various factors, including the number of total shards that may be used to reconstruct the original data using a redundancy encode. In some embodiments, the number of volumes used to store the original data of the archives is the quantity of shards that may be used to reconstruct the original data from a plurality of shards generated by a redundancy code from the original data. As an example, FIG. 8 illustrates five volumes, three of which contain original data archives 808 and two of which contain derived data 810, such as redundancy encoded data. In the illustrated example, the redundancy code used may require any three shards to regenerate original data, and therefore, a quantity of three volumes may be used to write the original data (even prior to any application of the redundancy code).

The volumes 806 bearing the original data archives 808 may each contain or be considered as shards unto themselves. For example, the data 802 from preliminary storage may be copied directly only to a volume if, as described herein, it is stored in preliminary storage as an identity shard. In embodiments where the sort order-related information and/or the indices are stored on the applicable volumes 806, they may be included with the original data of the archives and stored therewith as shards, as previously mentioned. In the illustrated example, the original data archives 808 are stored as three shards (which may include the respective indices) on three associated volumes 806. In some embodiments, the original data archives 808 (and, in embodiments where the indices are stored on the volumes, the indices) are processed by an entity associated with, for example, the archival storage service, using a redundancy code, such as an erasure code, so as to generate the remaining shards, which contain encoded information rather than the original data of the original data archives. The original data archives 808 may be processed using the redundancy code at any time after being sorted, such as prior to being stored on the volumes, contemporaneously with such storage, or after such storage.

Such encoded information may be any mathematically computed information derived from the original data, and depends on the specific redundancy code applied. As mentioned, the redundancy code may include erasure codes (such as online codes, Luby transform codes, raptor codes, parity codes, Reed-Solomon codes, Cauchy codes, Erasure Resilient Systematic Codes, regenerating codes, or maximum distance separable codes) or other forward error correction codes. In some embodiments, the redundancy code may implement a generator matrix that implements mathematical functions to generate multiple encoded objects correlated with the original data to which the redundancy code is applied. In some of such embodiments, an identity matrix is used, wherein no mathematical functions are applied and the original data (and, if applicable, the indices) are allowed to pass straight through. In such embodiments, it may be therefore contemplated that the volumes bearing the original data (and the indices) may correspond to objects encoded from that original data by the identity matrix rows of the generator matrix of the applied redundancy code, while volumes bearing derived data correspond to other rows of the generator matrix. In the example illustrated in FIG. 8, the five volumes 806 include three volumes that have shards (e.g., identity shards) corresponding to the original data of the original data archives 808, while two have encoded shards corresponding to the derived data 810 (also referred to herein as "derived shards"). As illustrated in FIG. 8, the three original data archives 808, and the two encoded shards corresponding to the derived data 810 form a bundle 818 (denoted by the dashed line). In this example, the applied redundancy code may result in the data being stored in a "3:5" scheme, wherein any three shards of the five stored shards are required to regenerate the original data, regardless of whether the selected three shards contain the original data or the derived data.

In some embodiments, if one of the volumes 806 or a shard stored thereon is detected as corrupt, missing, or otherwise unavailable, a new shard may be generated using the redundancy code applied to generate the shard(s) in the first instance. The new shard may be stored on the same volume or a different volume, depending, for example, on whether the shard is unavailable for a reason other than the failure of the volume. The new shard may be generated by, for example, the data storage system 804, by using a quantity of the remaining shards that may be used to regenerate the original data (and the index, if applicable) stored across all volumes, regenerating that original data, and either replacing the portion of the original data corresponding to that which was unavailable (in the case that the unavailable shard contains original data), or reapplying the redundancy code so as to provide derived data for the new shard.

As previously discussed, in some embodiments, the new shard may be a replication of the unavailable shard, such as may be the case if the unavailable shard includes original data of the archive(s). In some embodiments, the new shard may be selected from a set of potential shards as generated by, for example, a generator matrix associated with the redundancy code, so as to differ in content from the unavailable shard (such as may be the case if the unavailable shard was a shard generated from the redundancy code, and therefore contains no original data of the archives). As discussed throughout this disclosure, the shards and/or volumes may be grouped and/or layered.

In some embodiments, retrieval of an archive stored in accordance with the techniques described herein may be requested by a client entity under control of a customer of the computing resource service provider and/or the archival storage service provided therefrom, as described in further detail throughout this disclosure. In response to the request, the data storage system 804 may locate, based on information regarding the sort order of the archives as stored on the volumes 806, the specific volume on which the archive is located. Thereafter, the index or indices may be used to locate the specific archive, whereupon it may be read from the volume and provided to a requesting client entity. In embodiments where sparse indices are employed, the sort order information may be used to locate the nearest location (or archive) that is sequentially prior to the requested archive, whereupon the volume is sequentially read from that location or archive until the requested archive is found. In embodiments where multiple types of indices are employed, the data storage system 804 may initially determine which of the indices includes the most efficient location information for the requested archive based on assessing the criteria used to deploy the multiple types of indices in the first instance. For example, if archives under a specific size are indexed in a sparse index and archives equal to or over that size are indexed in a parallel dense index, the data storage system 804 may first determine the size of the requested archive, and if the requested archive is larger than or equal to the aforementioned size boundary, the dense index may be used so as to more quickly obtain the precise location of the requested archive.

In some embodiments, the volumes 806 may be grouped such that each given volume has one or more cohorts 816. In such embodiments, a volume set (e.g., all of the illustrated volumes 806) may be implemented such that incoming archives to be stored on the volumes are apportioned to one or more failure-decorrelated subsets of the volume set. The failure-decorrelated subsets may be some combination of the volumes 806 of the volume subset, where the quantity of volumes correlates to a number of shards required for the implemented redundancy code. In the illustrated example, the overall volume set may comprise two failure-decorrelated subsets (volumes in a horizontal row) where a given constituent volume is paired with a cohort (e.g., the cohort 816). In some embodiments, the incoming archives are apportioned to one or more of the cohorts in the failure-decorrelated subset according to, for example, a predetermined sequence, based on one or more attributes of the incoming archives, and the like.

The illustrated example shows, for clarity, a pair-wise cohort scheme, though other schemes are contemplated as within scope of this disclosure, some of which are outlined in greater detail herein. In the illustrated example, some of the volumes of the volume set store original data of incoming archives (e.g., original data archives 808 and/or original data archives 812), while others store derived data (e.g., derived data 810 and derived data 814). The data storage system 804 may implement a number of failure-decorrelated subsets to which to store the incoming archives, and in the pair-wise scheme pictured, the volumes used for a given archive may differ based on some arbitrary or predetermined pattern. As illustrated, some archives may be apportioned to volumes of a given cohort that are assigned to one pattern, or failure-decorrelated subset as shown by original data archives 808 and derived data 810, while others are apportioned to volumes in a different pattern as shown by original data archives 812 and derived data 814. The patterns, as mentioned, may be arbitrary, predefined, and/or in some cases, sensitive to attributes of the incoming data. In some embodiments, patterns may not be used at all, and the member volumes of a given failure-decorrelated subset may be selected randomly from a pool of volumes in the volume set.

Figure 9:
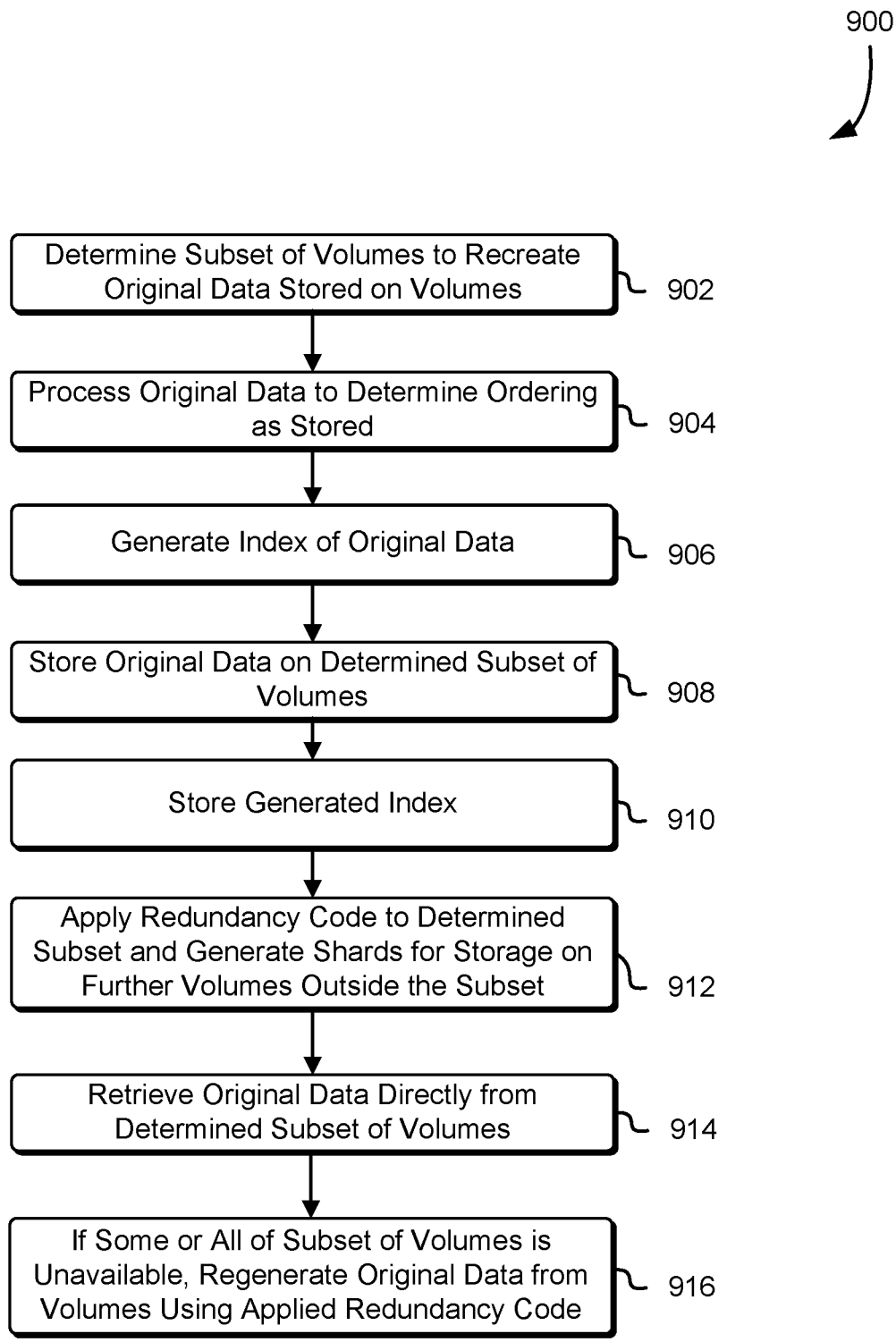
FIG. 9 illustrates an example process for applying redundancy encoding techniques to data stored in durable storage in accordance with at least one embodiment.

FIG. 9 illustrates an example process 900 for applying redundancy encoding techniques to data stored in durable storage as described herein in connection with FIG. 1 and in accordance with at least one embodiment. The example process 900 illustrated in FIG. 9 illustrates the processing, indexing, storing, and retrieving of data stored on a data storage system. The data may be retrieved from preliminary storage as described herein. The example process 900 illustrated in FIG. 9 may be used in conjunction with a grid encoding technique such that described in connection with FIG. 7, in conjunction with a bundle encoding technique such as that described in connection with FIG. 8, or with some other redundancy encoding technique. A data storage service such as the data storage service 112 described in connection with FIG. 1 may perform the example process 900 illustrated in FIG. 9.

At step 902, a resource of a data storage system, such as that implementing a redundancy code to store archives, determines which subset (e.g., quantity) of a plurality of volumes that may be used to recreate the original data to be stored, based on, for example, a redundancy code to be applied to the archives. For example, in accordance with the techniques described above in connection with FIG. 8, such information may be derived from predetermining the parameters of an erasure code with a specified ratio of shards that may be used to regenerate the original data from which they derive to the total number of shards generated from the application of the erasure code.

At step 904, original data, such as original data of archives received from customers of, for example, a data storage system or a computing resource service provider as described in further detail herein, is sorted by, for example, the data storage system or associated entity. For example, the sort order may be implemented on one or more attributes of the incoming data.

At step 906, one or more indices, such as sparse indices, are generated by, for example, the data storage system, for the original data. For example, there may be more than one index for a given volume, and such parallel indices may be of different types depending on the nature of the archives and/or original data being stored.

At step 908, the original data is stored, for example, by the data storage system, on the subset of volumes determined in connection with step 902, and in the order determined in step 904. Additionally, at step 910, the index generated in step 906 is stored, for example, by the data storage system, on an appropriate entity. For example, the index may be stored as part of a shard on which the original data is stored, or, in some embodiments, may be stored on a separate resource from that which persists the volume.

At step 912, the redundancy code is applied, for example, by the data storage system, to the determined subset of volumes (e.g., shards, as previously described herein), and additional shards containing data derived from the application of the redundancy code are stored on a predetermined quantity of volumes outside the subset determined in connection with step 902. For example, the ratio of volumes (e.g., shards as previously described herein) storing the original data to the overall quantity of volumes (including those storing the derived data generated in this step 912) may be prescribed by the recovery/encoding ratio of the redundancy code applied herein.

At step 914, in normal operation, requested data may be retrieved, for example, by the data storage system, directly from the subset of volumes storing the original data, without necessitating retrieval and further processing (e.g., by the redundancy code) from the volumes storing the derived data generated in step 912. However, at step 916, if any of the volumes are determined, for example, by the data storage system, to be unavailable, a replacement shard may be generated by the data storage system by reconstructing the original data from a quorum of the remaining shards, and re-encoding using the redundancy code to generate the replacement shard. The replacement shard may be the same or may be different from the shard detected as unavailable.

Figure 10:
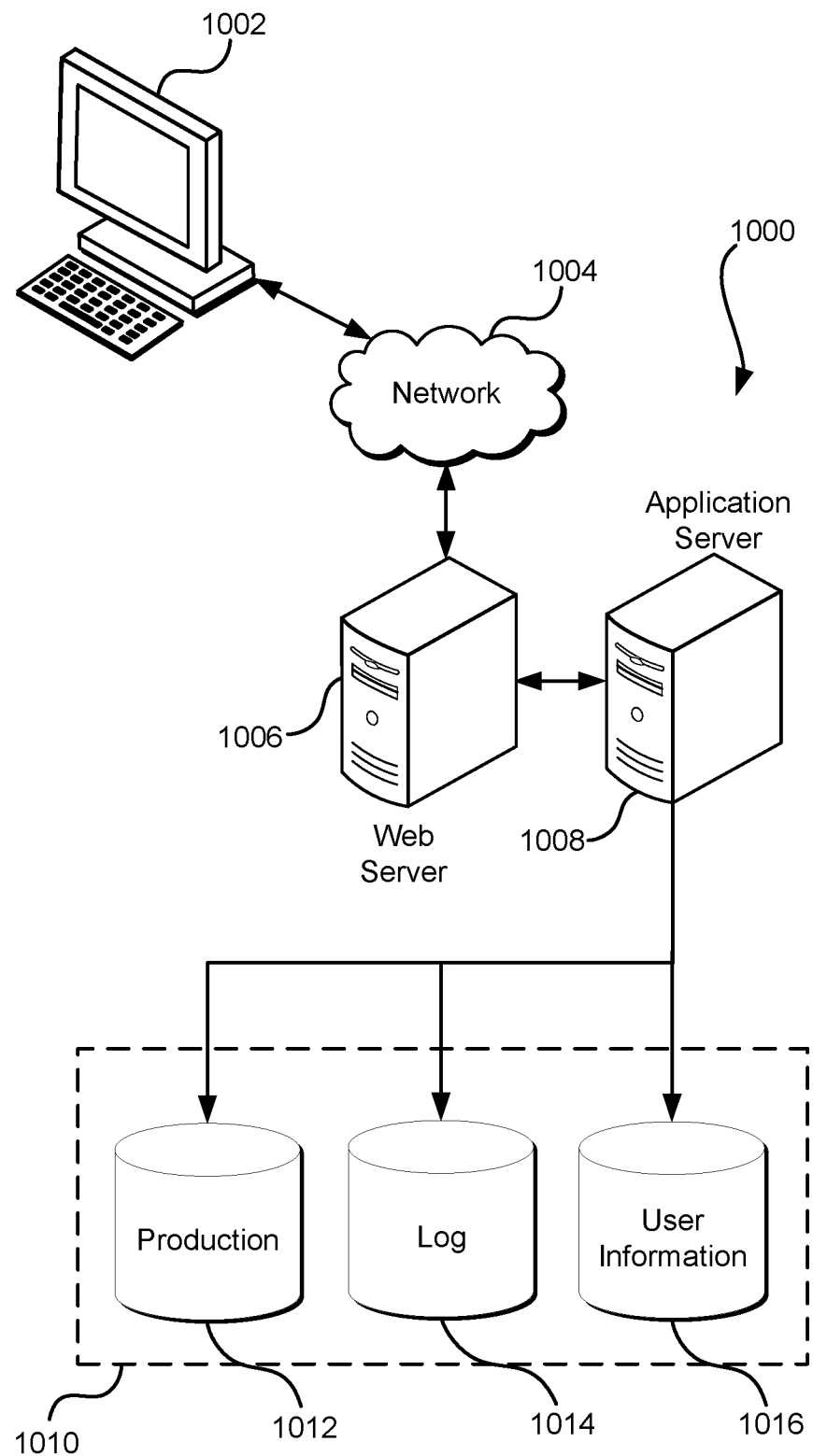
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages, or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 1002 and the application server 1008, can be handled by the web server using PHP: Hypertext Preprocessor ("PHP"), Python, Ruby, Perl, Java, HTML, XML, or another appropriate server-side structured language in this example. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. Further, in some examples, computer systems are configured to implement one or more services that collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving a request for a subset of sensor data;
   determining that the subset of the sensor data is inaccessible from a plurality of volumes on which the sensor data is stored;
   selecting a subset of the plurality of volumes;
   reading a second subset of the sensor data from the selected subset of the plurality of volumes;
   generating interpolated data using the second subset of the sensor data from the selected subset of the plurality of volumes; and
   providing, in response to the request, a data set that comprises the interpolated data.

2. The computer-implemented method of claim 1, further comprising, in response to the request for the sensor data:
   receiving, after generating the interpolated data, a second request for higher quality of the interpolated data;
   reading additional subsets of the sensor data from the subset of the plurality of volumes;
   refining the interpolated data by further interpolating the interpolated data using the second subset of the sensor data and the additional subsets of the sensor data; and
   providing the refined interpolated data, wherein the refined interpolated data is of higher quality than the interpolated data.

3. The computer-implemented method of claim 2, wherein the additional subsets of the sensor data are read from a second subset of volumes different from the selected subset of the plurality of volumes over a period of time until the entirety of the sensor data is provided.

4. The computer-implemented method of claim 1, wherein the interpolated data, when provided, fulfills the request for the subset of the sensor data or is an approximation of the requested subset of the sensor data.

5. A system, comprising:
   memory storing instructions that, as a result of being executed by one or more processors of the system, cause the system to:
   receive a request for a subset of sensor data that is unavailable in a plurality of volumes;
   identify a subset of the plurality of volumes on which a second subset of the sensor data is stored;
   retrieve the second subset of the sensor data from the identified subset of the plurality of volumes;
   interpolate the retrieved second subset of the sensor data so as to generate interpolated data representing the subset of the sensor data; and
   satisfy the request by providing a data set that includes the interpolated data.

6. The system of claim 5, wherein the generated interpolated data is an approximation of the subset of the sensor data.

7. The system of claim 5, wherein the interpolated data is generated by retrieving the second subset of the sensor data from volumes fewer than the entirety of the plurality of volumes.

8. The system of claim 5, wherein the instructions, as a result of being executed by the one or more processors of the system, further cause the system to interpolate the retrieved second subset of the sensor data using a linear interpolation or a polynomial interpolation.

9. The system of claim 5, wherein the instructions, as a result of being executed by the one or more processors of the system, further cause the system to:
receive a second request for higher resolution of the subset of the sensor data; and
refine the interpolated data, in response to the second request, by retrieving additional subsets of the sensor data from the plurality of volumes and further interpolating the interpolated data with the retrieved additional subsets to generate a refined interpolated data.

10. The system of claim 9, wherein the refined interpolated data is of higher quality than the generated interpolated data.

11. The system of claim 9, wherein additional subsets of sensor data are retrieved from the plurality of volumes and interpolated with the interpolated data until the refined interpolated data is a full data set of the subset of the sensor data.

12. The system of claim 5, wherein the instructions, as a result of being executed by the one or more processors of the system, further cause the system to retrieve, in response to the request, the subset of the sensor data from the subset of the plurality of volumes in a sequential order.

13. A non-transitory computer-readable storage medium having stored thereon executable instructions that, as a result of being executed by one or more processors of a computer system, cause the computer system to at least:
receive a request for a subset of sensor data;
determine that subset of the sensor data is irretrievable from a plurality of volumes on which the sensor data is stored;
select a second subset of the plurality of volumes;
read a second subset of the sensor data from the selected subset of the plurality of volumes;
generate interpolated data using only the second subset of the sensor data; and
satisfy the request by providing a data set based at least in part on the read second subset of the sensor data and the interpolated data.

14. The non-transitory computer-readable storage medium of claim 13, wherein the interpolated data is an approximation of the requested subset of the sensor data.

15. The non-transitory computer-readable storage medium of claim 13, wherein the interpolated data is generated by using the read second subset of the sensor data from the selected subset of the plurality of volumes without having to retrieve from all of the plurality of volumes.

16. The non-transitory computer-readable storage medium of claim 13, wherein the plurality of volumes comprises a sequence of volumes that store subsets of the sensor data in sequential order.

17. The non-transitory computer-readable storage medium of claim 13, wherein the instructions further comprise instructions that, as a result of being executed by the one or more processors, cause the computer system to:
receive a second request for the sensor data; and
refine the interpolated data, in response to the second request, by retrieving additional subsets of the sensor data from the plurality of volumes and further interpolating the interpolated data with the retrieved additional subsets of the sensor data to generate a refined interpolated data.

18. The non-transitory computer-readable storage medium of claim 17, wherein the instructions further comprise instructions that, as a result of being executed by the one or more processors, cause the computer system to provide the refined interpolated data in response to the second request, wherein the refined interpolated data is of higher quality than the generated interpolated data.

19. The non-transitory computer-readable storage medium of claim 18, wherein the second request is satisfied over a period of time after the request has been satisfied.

20. The non-transitory computer-readable storage medium of claim 13, wherein the sensor data comprises information about an operation of a plurality of remote devices.

* * * * *